(12) United States Patent
Eto et al.

(10) Patent No.: US 10,565,694 B2
(45) Date of Patent: Feb. 18, 2020

(54) IMAGE PROCESSING APPARATUS, IMAGE PROCESSING METHOD, AND PROGRAM FOR REPRODUCING TONE OF A HIGH DYNAMIC RANGE (HDR) IMAGE

(71) Applicant: SONY CORPORATION, Tokyo (JP)

(72) Inventors: Hiroaki Eto, Kanagawa (JP); Hidetaka Honji, Tokyo (JP)

(73) Assignee: SONY CORPORATION, Tokyo (JP)

( * ) Notice: Subject to any disclaimer, the term of this patent is extended or adjusted under 35 U.S.C. 154(b) by 106 days.

(21) Appl. No.: 15/564,048

(22) PCT Filed: Apr. 26, 2016

(86) PCT No.: PCT/JP2016/062983
§ 371 (c)(1),
(2) Date: Oct. 3, 2017

(87) PCT Pub. No.: WO2016/181819
PCT Pub. Date: Nov. 17, 2016

(65) Prior Publication Data
US 2018/0096466 A1    Apr. 5, 2018

(30) Foreign Application Priority Data
May 12, 2015 (JP) .................................. 2015-097325

(51) Int. Cl.
*G06K 9/36* (2006.01)
*G06T 5/00* (2006.01)
(Continued)

(52) U.S. Cl.
CPC ............... *G06T 5/007* (2013.01); *G09G 3/20* (2013.01); *G09G 5/391* (2013.01); *H04N 1/407* (2013.01); *H04N 1/46* (2013.01); *H04N 9/3182* (2013.01)

(58) Field of Classification Search
CPC .......... G09G 5/10; G09G 5/005; G09G 5/391; G09G 2320/0673; G09G 2320/0276;
(Continued)

(56) References Cited

U.S. PATENT DOCUMENTS 6,563,534 B1 * 5/2003 Shimizu ................. H04N 5/202
                                                       348/211.14
2008/0019608 A1 * 1/2008 Zuro ....................... G06T 5/009
                                                       382/274
(Continued)

FOREIGN PATENT DOCUMENTS

JP    2014-502480 A    1/2014
JP    2014-531821 A    11/2014
(Continued)

*Primary Examiner* — Amara Abdi
(74) *Attorney, Agent, or Firm* — Paratus Law Group, PLLC

(57) ABSTRACT

There are provided an apparatus and method capable of displaying HDR image on SDR display apparatus without large deterioration in image quality. The apparatus has a display control unit for converting an HDR image signal and generating an output signal into a display unit. The display control unit converts an input HDR image signal in case the HDR image signal is input, and generates and outputs a converted HDR signal according to a γ correction curve with an I/O characteristic reverse to a γ curve corresponding to an I/O characteristic of an SDR display unit to the display unit. In case the γ curve corresponding to the I/O characteristic of the SDR display unit is a 2.2-th power curve, the display control unit converts the input HDR image signal, and generates and outputs a converted HDR signal with I/O characteristic according to a (1/2.2)-th power curve to the display unit.

11 Claims, 13 Drawing Sheets

(51) Int. Cl.
*H04N 1/407* (2006.01)
*H04N 1/46* (2006.01)
*G09G 5/391* (2006.01)
*G09G 3/20* (2006.01)
*H04N 9/31* (2006.01)

(58) Field of Classification Search
CPC .. G09G 2370/04; G09G 2340/06; G09G 3/20; H04N 1/407; H04N 1/46; H04N 9/3182; H04N 5/202; G06T 5/007; G06T 5/00
See application file for complete search history.

(56) References Cited

U.S. PATENT DOCUMENTS

| | | | | |
|---|---|---|---|---|
| 2009/0284616 | A1* | 11/2009 | Daiku | H04N 5/202 348/229.1 |
| 2012/0113130 | A1* | 5/2012 | Zhai | G06T 5/008 345/589 |
| 2014/0210847 | A1* | 7/2014 | Knibbeler | G09G 5/006 345/589 |

FOREIGN PATENT DOCUMENTS

| | | |
|---|---|---|
| JP | 2015-510600 A | 4/2015 |
| WO | WO2014/130343 A2 | 8/2014 |
| WO | WO2015/190044 A1 | 12/2015 |

\* cited by examiner

FIG. 6
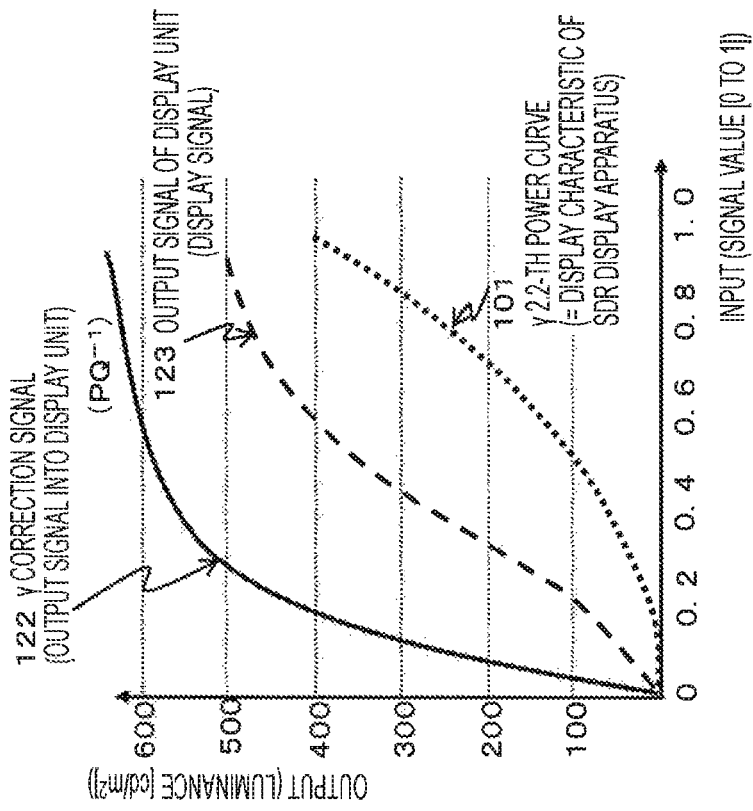
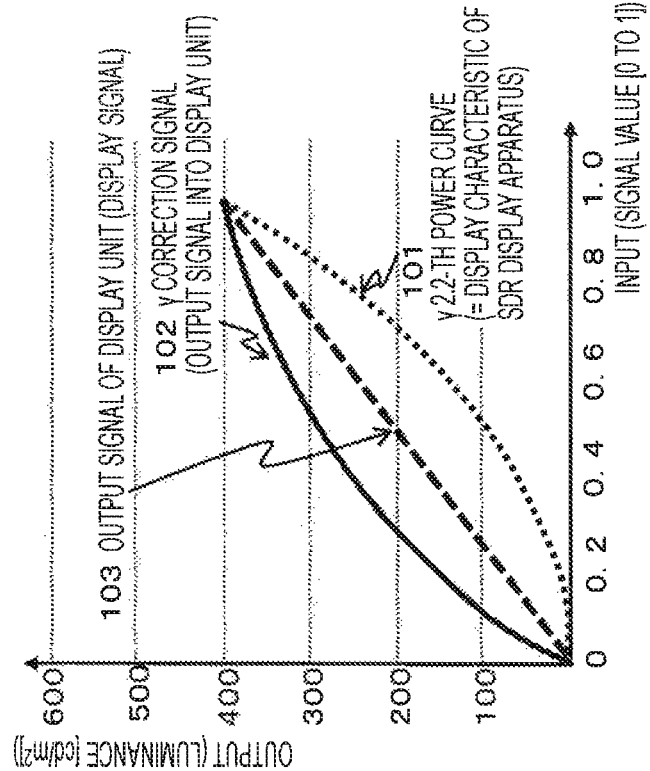

IMAGE PROCESSING APPARATUS, IMAGE PROCESSING METHOD, AND PROGRAM FOR REPRODUCING TONE OF A HIGH DYNAMIC RANGE (HDR) IMAGE

CROSS REFERENCE TO PRIOR APPLICATION

This application is a National Stage Patent Application of PCT International Patent Application No. PCT/JP2016/062983 (filed on Apr. 26, 2016) under 35 U.S.C. § 371, which claims priority to Japanese Patent Application No. 2015-097325 (filed on May 12, 2015), which are all hereby incorporated by reference in their entirety.

TECHNICAL FIELD

The present disclosure relates to an image processing apparatus, an image processing method, and a program. More specifically, the present disclosure relates to an image processing apparatus capable of displaying a high dynamic range (HDR) image on a typical standard dynamic range (SDR) display apparatus which is a dynamic range image display apparatus widely used at present without a large deterioration in image quality, an image processing method, and a program.

BACKGROUND ART

In recent years, a dynamic range for images has been higher along with higher bits of an image sensor.

A dynamic range of an image can be generally expressed with a ratio between minimum luminance and maximum luminance.

A high dynamic range (HDR) image as known as high-quality image has a contrast ratio of 10000:1 or more between highest brightness and lowest brightness, for example, and can realistically express an actual world.

With a HDR image, almost all the luminance in a visible range can be recorded, and a dynamic range and color gamut equivalent to human visible characteristics can be supported. A HDR image can be a much higher-quality image than conventional images in terms of realistic expression of shading, expression of dazzle, and the like.

While content productions actively shoot and produce HDR images, many display apparatuses such as a home TV for watching or listening to contents cannot actually display the HDR images.

Many display apparatuses such as a home TV are standard dynamic range (SDR) display apparatuses capable of displaying images with a lower dynamic range than the HDR images. Actually, only some users utilize HDR-compliant display apparatuses with maximum luminance of 500 nit or 1000 nit.

In a case where a HDR image is input in and displayed on a SDR display apparatus, the original luminance information and color information of the HDR image are lost and an image with deteriorated image quality is displayed. Additionally, in a case where a HDR image is output as SDR image, a processing (also called display mapping) of adapting the dynamic range of the original contents to the SDR display apparatus to which the image is output may be performed (see Patent Document 1, for example)

However, all the display apparatuses do not include the display mapping function. Further, in a case where a dynamic range is simply converted by linear scaling, a large amount of information is lost, and there is a concern that the images in which appearances of humans are largely different before and after the conversion. The loss of information has an effect on an intention of a content production or supplier.

CITATION LIST

Patent Document

Patent Document 1: Japanese Unexamined Patent Application Publication No. 2014-502480

SUMMARY OF THE INVENTION

Problems to be Solved by the Invention

The present disclosure has been made in terms of such situations, for example, and it is an object thereof to provide an image processing apparatus for reproducing tone such as color or luminance of an original high dynamic range (HDR) image more accurately and displaying a high-quality image in a case where the HDR image is displayed on a SDR display apparatus, an image processing method, and a program.

Solutions to Problems

A first aspect of the present disclosure lies in
an image processing apparatus including:
a display control time for inputting an image signal for a high dynamic range (HDR) image or a standard dynamic range (SDR) image and generating an output signal into a display unit,
in which the display unit is a SDR display unit with a γ value for SDR image, and
in a case where an input signal into the display control unit is a HDR image signal, the display control unit performs a processing of converting the input HDR image signal, and generates and outputs a converted HDR signal according to a γ correction curve with an I/O characteristic reverse to a γ curve corresponding to an I/O characteristic of the SDR display unit to the display unit.

Furthermore, a second aspect, of the present disclosure lies in
an image processing method performed in an image processing apparatus,
in which the image processing apparatus includes a display control unit for inputting an image signal for a high dynamic range (HDR) image or a standard dynamic range (SDR) image and generating an output signal into a display unit,
the display unit is a SDR display unit with a γ value for SDR image, and
in a case where an input signal into the display control unit is a HDR image signal, the display control unit performs a processing of converting the input HDR image signal, and generates and outputs a converted HDR signal according to a γ correction curve with an I/O characteristic reverse to a γ curve corresponding to an I/O characteristic of the SDR display unit to the display unit.

Furthermore, a third aspect of the present disclosure lies in
a program for causing an image processing apparatus to perform an image processing,
in which the image processing apparatus includes a display control unit for inputting an image signal for a high dynamic range (HDR) image or a standard dynamic range (SDR) image and generating an output signal into a display unit, the display unit is a SDR display unit with a γ value for SDR image, and in a case where an input signal into the display control unit is a HDR image signal, the program causes the display control unit to perform a processing of converting the input HDR image signal, and to generate and output a converted HDR signal according to a γ correction curve with an I/O characteristic reverse to a γ curve corresponding to an I/O characteristic of the SDR display unit to the display unit.

Additionally, the program according to the present disclosure is a program capable of being provided to an information processing apparatus or computer system capable of executing various program codes via a computer-readable storage medium or communication medium, for example. Such a program is provided in a computer-readable form, and thus the processings can be realized in an information processing apparatus or computer system according to the program.

Still other objects, features, and advantages of the present disclosure will be apparent in the following more detailed description with reference to an embodiment of the present disclosure or the accompanying drawings. Additionally, a system in the present specification indicates a logically-collective configuration of apparatuses, and the apparatuses in each configuration may not necessarily be present in the same casing.

Effects of the Invention

With the configuration according to one embodiment of the present disclosure, an apparatus and method capable of displaying a HDR image on a SDR display apparatus without a large deterioration in image quality are realized.

Specifically, the apparatus has a display control unit for converting a HDR image signal and generating an output signal into a display unit. In a case where a HDR image signal is input, the display control unit performs a processing of converting the input HDR image signal, generates a converted HDR signal according to a γ correction curve with a reverse I/O characteristic to a γ curve corresponding to an I/O characteristic of the SDR display unit, and outputs it to the display unit. In a case where the γ curve corresponding to the I/O characteristic of the SDR display unit is a 2.2-th power curve, the display control unit performs the processing of converting the input HDR image signal, generates a converted HDR signal with an I/O characteristic according to a (1/2.2)th-power curve, and outputs it to the display unit.

With the processings according to the present disclosure, the apparatus and method capable of displaying a HDR image on a SDR display apparatus without a large deterioration in image quality are realized.

Additionally, the effects described in the present specification are merely exemplary and are not limited, and additional effects may be obtained.

BRIEF DESCRIPTION OF DRAWINGS

FIG. 6 is a diagram for explaining processings for SDR image and processings for HDR image.

MODE FOR CARRYING OUT THE INVENTION

Figure 1:
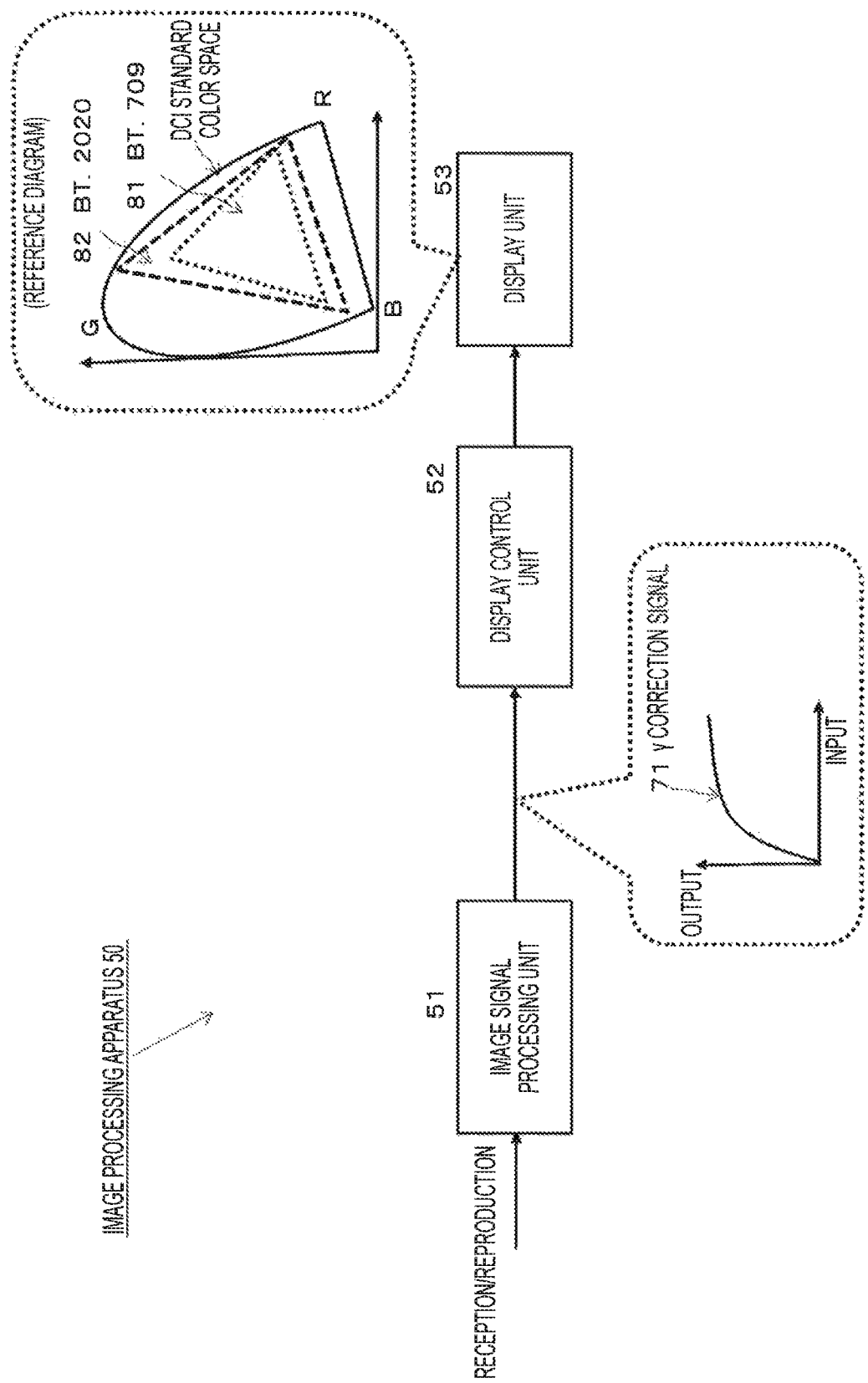
FIG. 1 is a diagram for explaining a configuration and the processings of an image processing apparatus.

An image processing apparatus, an image processing method, and a program according to the present disclosure will be described below in detail with reference to the drawings. Additionally, the description will be made according to the following items.

1. Outline of image display processing in image processing apparatus
2. Problems of HDR image output processing on SDR display unit
3. Configuration capable of displaying HDR image and SDR image on SDR display unit without deterioration in image quality
3-1. Input signal generation processing in display unit for processing SDR image
3-2. Input signal generation processing in display unit for processing HDR image
4. Processing sequence of display control unit
5. Exemplary configuration of image processing apparatus
6. Summary of configuration of present disclosure 1. Outline of Image Display Processing in Image Processing Apparatus Typical exemplary processings of an image display processing in an image processing apparatus will be first described with reference to FIG. 1.

An image processing apparatus 50 in FIG. 1 is a user apparatus (client) including a display unit such as TV, Smartphone, or PC.

The image processing apparatus 50 displays reception image data from a broadcast station, streaming server, or the like, or reproduction image data from a medium such as Blu-ray (trademark) disc (BD) on a display unit 53.

An image signal processing unit 51 decodes an encoded stream such as MPEG-2TS input from a broadcast station, a server, or a medium such as Blu-ray (trademark) disc (BD), and generates and outputs an image signal generated on the basis of the decoded data to a display control unit 52.

For example, a γ correction signal 71 is generated depending on a display characteristic (γ characteristic) of the display unit 53 and output to the display control unit 52.

The display control unit 52 generates an output signal into the display unit 53 on the basis of an input signal from the image signal processing unit 51.

The display unit 53 drives a display panel by use of an input signal from the display control unit 52, and displays an image.

The image data configuring the contents provided by a broadcast station or server or stored in a medium has changed to high-quality images over time. Specifically, a 2K image has transited to a higher-resolution image called 4K image or 8K image.

Further, there have been widely used high dynamic range (HDR) images capable of accurately reproducing an image in a wide luminance range from lower luminance to higher luminance than the typical standard dynamic range (SDR) images.

A HDR image has a displayable higher dynamic range than a SDR image, can display all the luminance in a visible range, and can support a dynamic range and color gamut almost equivalent to human visible characteristics.

(Reference diagram) indicated for the display unit 53 illustrated in FIG. 1 is for explaining color gamut displayed on the display unit 53, and illustrates two color systems defined in the DCI standard color space.

ITU-R BT.709 color system, and ITU-RBT.2020 color system capable of color expression in a wider range are illustrated.

A HDR image is output at a signal value of 10 to 12 bits at which luminance is nonlinearly converted by user of optical-electro transfer function (OETF) conforming to ITU-R BT.2020, for example.

A HDR image is output as an image correctly expressing luminance and color information without any problem if the display unit 53 is a HDR display unit capable of outputting a dynamic range for HDR images.

However, in a case where the display unit 53 is not for HDR and is a display unit (SDR display unit) for SDR images for which luminance and color range capable of being expressed are lower and narrower than the HDR images, luminance and color information may not be correctly output.

The image signal processing unit 51 in the image processing apparatus 50 illustrated in FIG. 1 generates an output signal into the display unit 53. For example, the γ correction signal 71 is generated depending on the display characteristic (γ characteristic) of the display unit 53.

The display unit 53 drives the display panel by use of the γ correction signal 71, and displays an image.

Figure 2:
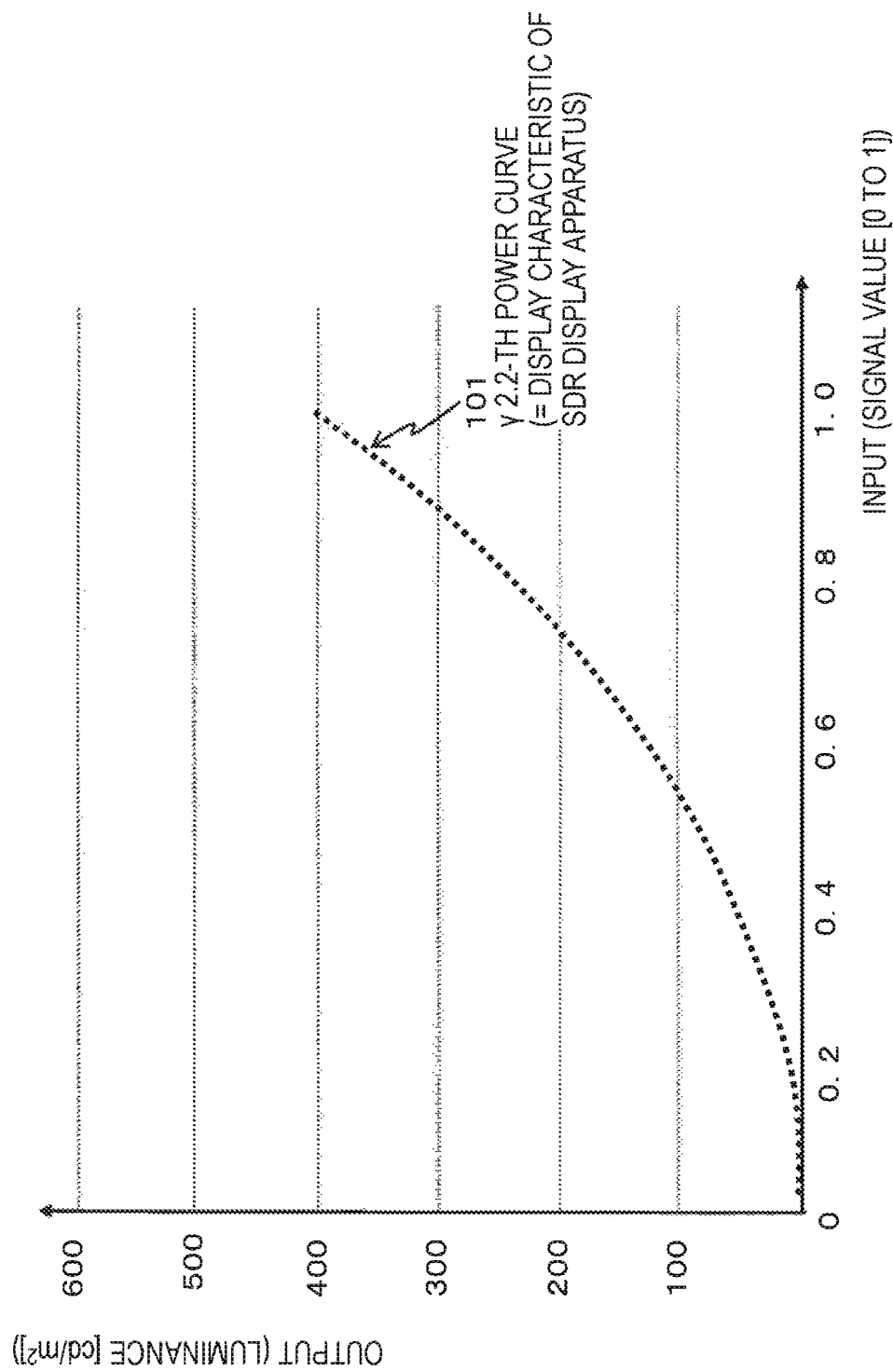
FIG. 2 is a diagram for explaining an exemplary γ curve as I/O characteristic of a SDR display apparatus.

FIG. 2 is a diagram illustrating the display characteristic of a typical SDR display unit or a SDR display unit for SDR images for which luminance and color range capable of being expressed are lower and narrower than HDR images.

The horizontal axis indicates input (signal value of 0 to 1.0) and the vertical axis indicates output (luminance value). An illustrated curve 101 is a γ 2.2-th power curve corresponding to a γ value of 2.2. The curve indicates an I/O characteristic of a typical SDR display apparatus.

The curve 101 has the following relationship or the relationship of $y=x^{2.2}$ between input x corresponding to the horizontal axis and output y corresponding to the vertical axis.

The curve 101 is also called a 2.2-th power curve and is a γ 2.2-th power curve indicating the I/O characteristic of a typical SDR display apparatus (γ value=2.2) widely used at present.

A γ correction signal as an output signal into a typical SDR display apparatus with the display characteristic according to the γ 2.2-th power curve will be described with reference to FIG. 3.

Figure 3:
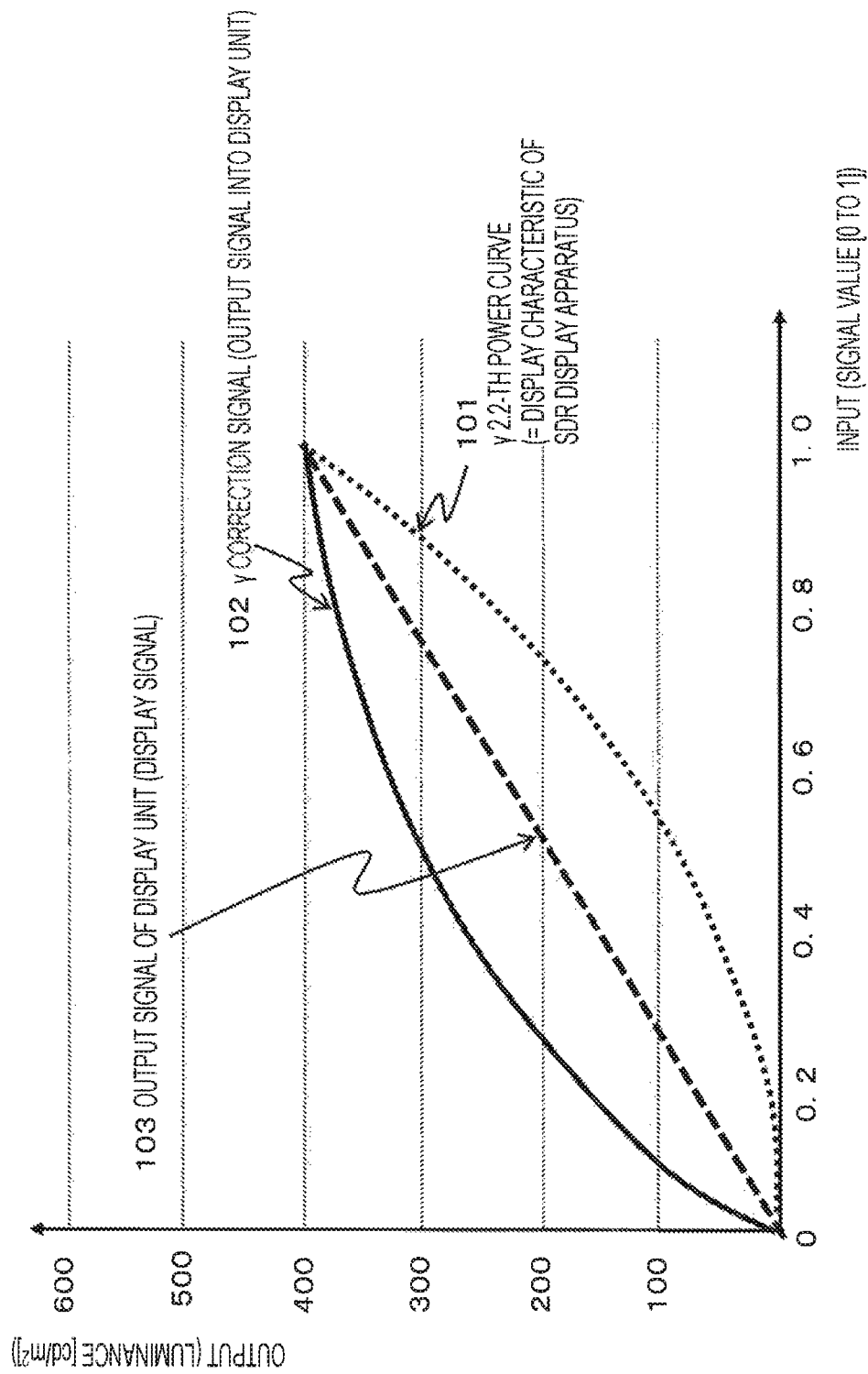
FIG. 3 is a diagram for explaining a γ curve, a γ correction curve, and an output signal of a display unit by way of example.

As illustrated in FIG. 3, a γ correction signal 102 with a reverse characteristic to the γ 2.2-th power curve illustrated in FIG. 3 is output to the SDR display unit in which the I/O characteristic is the γ 2.2-th power curve 101, thereby obtaining output 103 of the display unit in which output (luminance value and color value) of the display unit is linear to an input signal.

In this way, the display unit output is performed by use of the γ correction signal so that a correspondence between the input signal and the output signal (luminance value and color value) is linear and an image correctly expressing luminance and color of the input image can be displayed.

2. Problems of HDR Image Output Processing on SDR Display Unit

The processings described with reference to FIG. 3 are exemplary processings using the γ correction signal generated for the γ 2.2-th power curve as display unit characteristic of the SDR display unit, and in this case, a SDR image displayed on the SDR display unit correctly expresses luminance and color of an original input SDR image.

However, a HDR image with a higher dynamic range than a SDR image has the entirely different characteristic from the image characteristic of the SDR image.

The image characteristics of a HDR image and a SDR image will be described with reference to FIG. 4.

Figure 4:
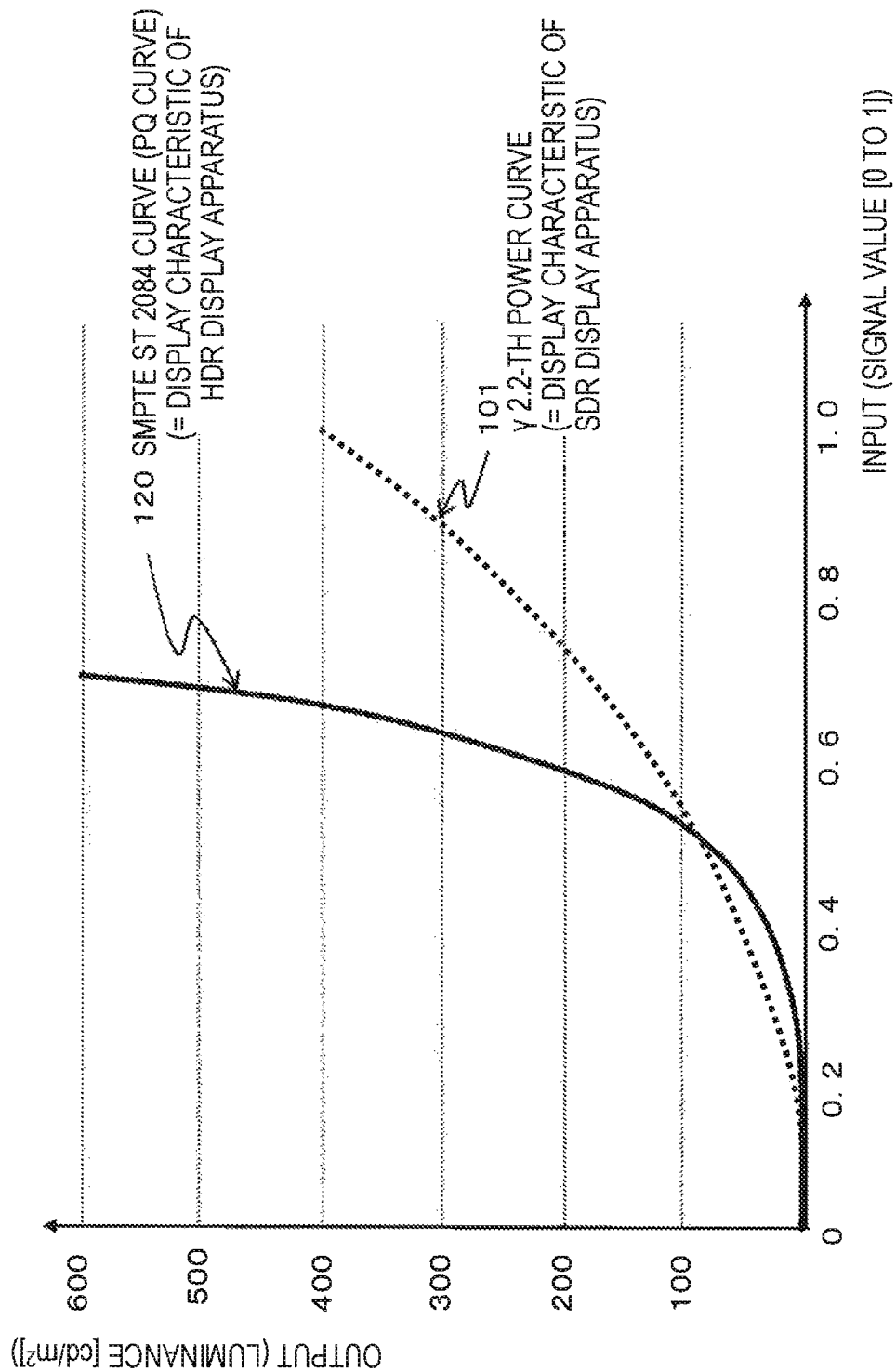
FIG. 4 is a diagram for explaining a difference in characteristic between HDR image and SDR image.

The graph illustrated in FIG. 4 indicates a correspondence between input (signal value) and output (luminance) assuming the horizontal axis of input (signal value (0 to 1)) and the vertical axis of output (luminance ($cd/m^2$)).

FIG. 4 illustrates a γ 2.2-th power curve 101 corresponding to the image characteristic of a SDR image (=display characteristic of a SDR display apparatus) and a SMPTE ST 2084 curve 120 corresponding to the image characteristic of a HDR image (=display characteristic of a HDR display apparatus).

The SMPTE ST 2084 curve 120 is a representative characteristic curve of a HDR image, and is defined as society of motion picture and television engineer (SMPTE) standard.

Additionally, the SMPTE ST 2084 curve is called perceptual quantization (PQ) curve.

The PQ curve (=SMPTE ST 2084 curve) is used for generating encoded data for a dynamic range in a luminance range of 0.05 to 10,000 Nit configuring a HDR usage. Specifically, the dynamic range in the luminance range of 0.05 to 10,000 Nit configuring a HDR image is converted according to the PQ curve (=SMPTE ST 2084 curve 120) defined as curve in quantization step according to human eyes, thereby generating an image signal within a tone of predetermined bits (such as 12 bits).

As is clear from FIG. 4, a displayable luminance range of a HDR image is much wider than a displayable luminance range of a SDR image. That is, higher dynamic range is realized.

However, as illustrated in FIG. 4, the γ 2.2-th power curve for SDR image has the entirely different characteristic from the SMPTE ST 2084 curve for HDR image.

Hereafter, if contents of HDR images increase, images input by the image signal processing unit 51 in the image processing apparatus 50 described with reference to FIG. 1 cause two cases for SDR image and for HDR image.

That is, the image processing apparatus 50 displays image contents made of either a SDR image signal or a HDR image signal on the display unit 53.

However, the display apparatuses held in many user apparatuses are actually display apparatuses not for HDR image in the present circumstances. That is, many SDR display units for SDR image, which cannot display high dynamic range images defined for HDR image, are actually used.

In a case where the display unit 53 in the image processing apparatus 50 is a SDR display unit for SDR image, if an input image in the image processing apparatus 50 is a SDR image, a γ correction signal corresponding to the γ 2.2-th power curve described above with reference to FIG. 2 and FIG. 3 is generated, thereby outputting an image correctly expressing luminance and color of the original SDR image on the display unit.

However, in a case where a HDR image, which has a higher dynamic range than a SDR image and has the characteristic corresponding to the SMPTE ST 2084 curve illustrated in FIG. 4, is input, even if a similar processing to the processing for SDR image is performed, the display signal 103 in a linear relationship between input (signal) and output (luminance and color) described with reference to FIG. 3 is not generated. Thus, there is caused a problem that luminance and color of a HDR image are not reproduced and image quality is deteriorated.

3. Configuration Capable of Displaying HDR Image and SDR Image on SDR Display Unit Without Deterioration in Image Quality A configuration for solving the above problem, or a configuration capable of displaying a HDR image and a SDR image on the SDR display unit without a deterioration in image quality will be described below.

The image processing apparatus 50 illustrated in FIG. 1 needs to display two types of contents including contents made of HDR image and contents made of SDR image on the display unit 53.

There will be described below a configuration capable of displaying both a HDR image and a SDR image without a large deterioration in image quality in a configuration in which the display unit 53 in the image processing apparatus 50 illustrated in FIG. 1 is a display unit for SDR image or a SDR display unit with the image display characteristic corresponding to the γ 2.2-th power curve described above with reference to FIG. 2 and FIG. 3.

Figure 5:
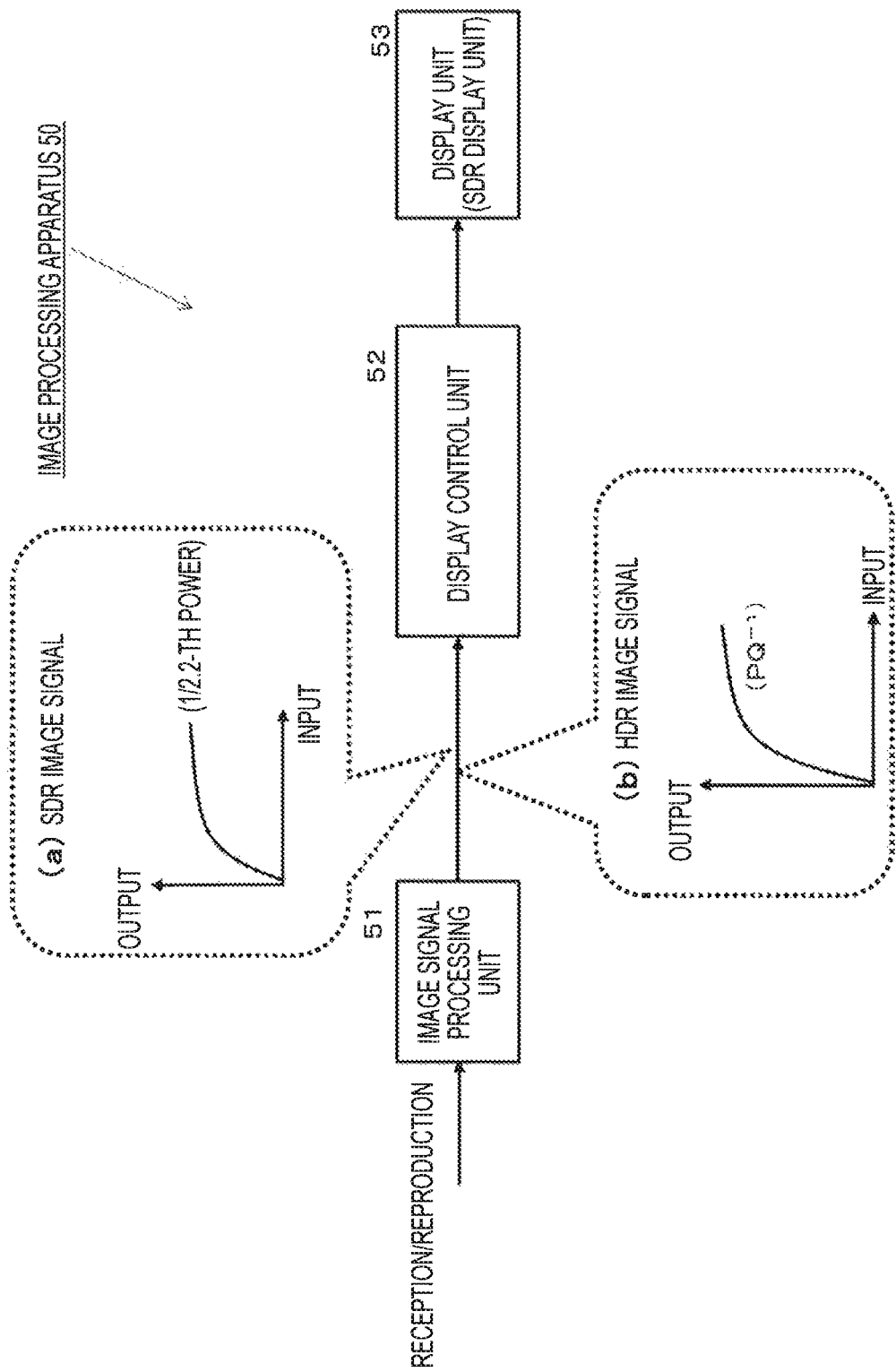
FIG. 5 is a diagram for explaining a configuration and the processings of the image processing apparatus.

The image processing apparatus 50 displays a HDR image and a SDR image, which are different in image characteristic as illustrated in FIG. 5, on the display unit (SDR display unit) 53.

Additionally, the image signal processing unit 51 in the image processing apparatus 50 in FIG. 5 generates and outputs an output signal corresponding to the γ correction signal 102 described above with reference to FIG. 3 to the display control unit 52.

In a case where an image signal input by the image signal processing unit 51 is a SDR image signal, a SDR image signal illustrated in FIG. 5(*a*) is generated and output to the display control unit 52.

The SDR image signal in (a) corresponds to a γ correction signal for SDR image. That is, it is a (1/2/2)-th power curve with a reverse characteristic to the γ 2.2-th power curve illustrated in FIG. 2 to FIG. 4.

Assuming the horizontal axis (input) as x and the vertical axis (output) as y, the characteristic curve of the SDR image illustrated in FIG. 5 can be expressed as:

$$y = x^{(1/2.2)}$$

Additionally, the input signal (x) is generated for luminance and color value displayed on the display unit. Specifically, it corresponds to a signal value of 8 to 12 bits, for example. Further, the output (y) corresponds to a luminance value and color value displayed on the display unit.

In a case where an input image signal into the image signal processing unit 51 is a HDR image signal, the image signal processing unit 51 generates and outputs a HDR image signal illustrated in FIG. 5(*b*) to the display control unit 52.

The HDR image signal in (b) is a $(PQ^{-1})$ curve with a reverse characteristic to the SMPTE ST 2084 curve (PQ curve) 120 illustrated in FIG. 4.

In a case where an input image signal is a HDR image signal, the image signal processing unit 51 generates a γ correction signal assuming that the display unit is a HDR display unit capable of outputting a HDR image. That is, the $(PQ^{-1})$ curve illustrated in FIG. 5(*b*), which has the reverse characteristic to the SMPTE ST 2084 curve (PQ curve) 120 illustrated in FIG. 4, is generated as γ correction signal and is output to the display control unit 52.

However, the display unit 53 in the image processing apparatus 50 is a SDR display unit according to the present embodiment. That is, the SDR display unit 53, which is not for displaying HDR images with high dynamic range, is used.

There will be described, with reference to FIG. 6, the displayed images on the SDR display unit 53 in a case where a γ correction signal for SDR image illustrated in FIG. 4(*a*) is output and in a case where a γ correction signal for HDR image illustrated in FIG. 4(*b*) is output.

FIG. 6 illustrates the following two exemplary image signals.

(A) Exemplary output signal on the display unit of SDR image for SDR display unit (B) Exemplary output signal on the display unit of HDR image for SDR display unit FIG. 6(A) is a diagram for explaining the processing described above with reference to FIG. 3, or a processing of displaying a SDR image on the SDR display unit.

The SDR display unit 53 has the display characteristic according to the γ 2.2-th power curve 101 illustrated in FIG. 6.

As illustrated in FIG. 6(A), the γ correction signal 102 with the reverse characteristic to the γ 2.2-th power curve illustrated in FIG. 6(A) is input in the SDR display unit 53 with the I/O characteristic expressed by the γ 2.2-th power curve 101, thereby obtaining the output 103 of the display unit with linear input (signal value) and output (luminance) of the display unit 53.

In this way, the γ correction signal adapted to the SDR display unit is applied to the SDR image, and thus the linear relationship between the I/O signals is reproduced, and an image correctly expressing luminance and color of the original SDR image is displayed on the SDR display unit 53.

FIG. 6(B) is a diagram for explaining a processing of displaying a HDR image on the SDR display unit.

The SDR display unit 53 has the display characteristic according to the γ 2.2-th power curve 101 illustrated in FIG. 6.

In case where a HDR image is displayed, a HDR image signal illustrated in FIG. 5(*b*) is input in the display unit 53. As illustrated in FIG. 6(B), a γ correction signal 122 for HDR illustrated in FIG. 6(B) is input in the SDR display unit 53 with the I/O characteristic expressed by the γ 2.2-th power curve 101.

The γ correction signal 122 for HDR illustrated in FIG. 6(B) is a (PQ⁻¹) curve with the reverse characteristic to the SMPTE ST 2084 curve (PQ curve) 120 illustrated in FIG. 4. Even if the γ correction signal 122 is output to the SDR display unit 53, the linear relationship between signal and luminance is not reproduced.

An image is output to the SDR display unit 53 according to an output signal 123 of the display unit with a curve illustrated in FIG. 6(B).

Consequently, the linear relationship between input (signal) and output (luminance) is not kept, and the luminance and color of the original HDR image are not correctly expressed on the SDR display unit 53.

In this way, in a case where an input image is a SDR image in the image processing apparatus 50 illustrated in FIG. 5, a SDR image with correctly-expressed tone such as luminance and color can be displayed by the output of the display unit 53 to which the γ correction signal for SDR image generated by the image signal processing unit 51 is applied.

However, in a case where an input image is a HDR image, if the γ correction signal for HDR image generated by the image signal processing unit 51 is applied for the output of the display unit 53, an image on which luminance and color of the original HDR image are not correctly reflected is displayed.

In order to solve the problem, the image processing apparatus according to the present disclosure performs different processings in the display control unit 52 between in a case where an image to be processed is a SDR image and in a case where an image to be processed is a HDR image. The processings will be described below in detail.

3-1. Input Signal Generation Processing in Display Unit for Processing SDR Image An input signal generation processing in the display unit will be first described in a case where an image to be processed in the image processing apparatus 50 is a SDR image.

Figure 7:
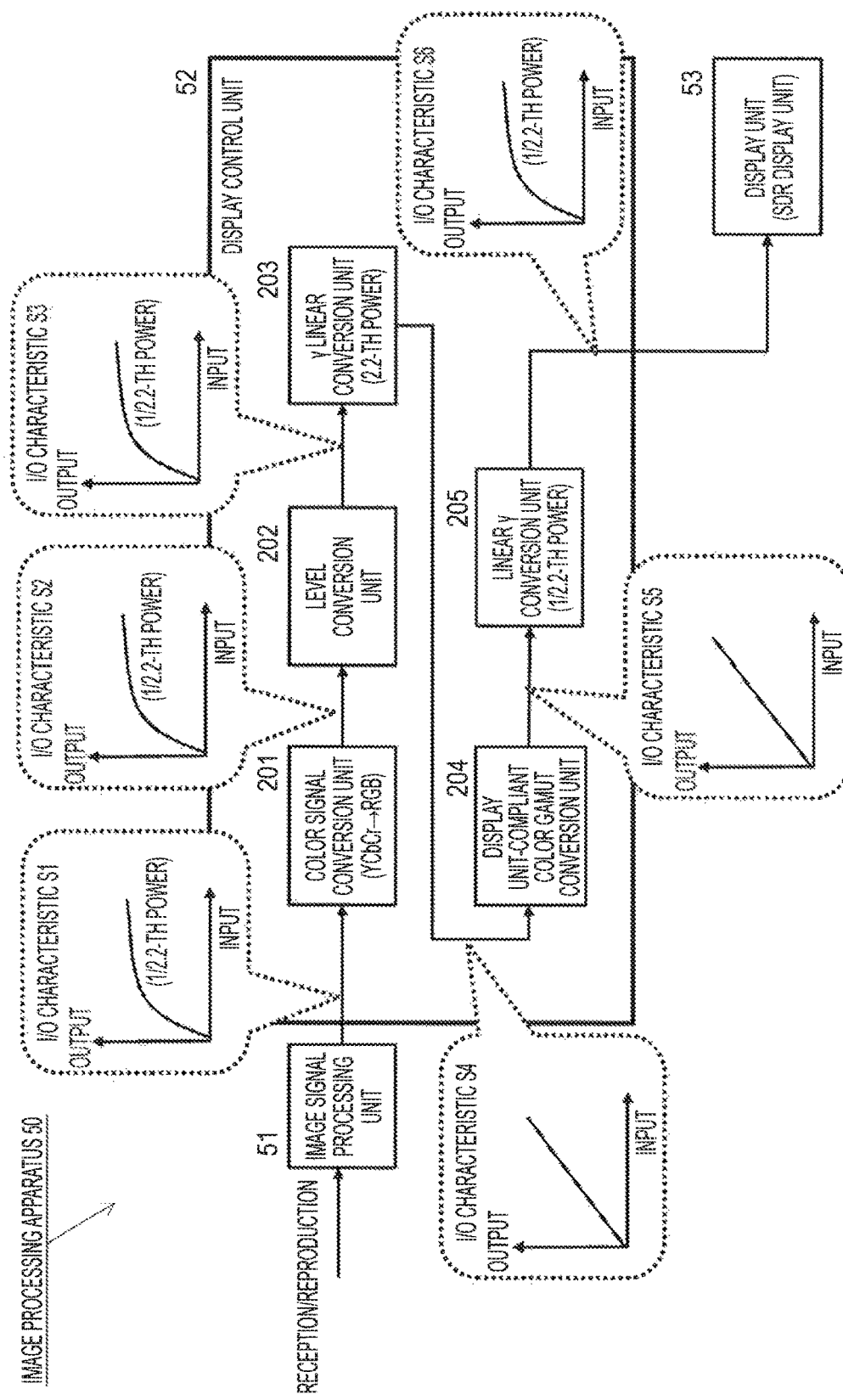
FIG. 7 is a diagram for explaining the processings for SDR image in the image processing apparatus.

FIG. 7 is a diagram for explaining the processings for SDR image performed in the display control unit 52 in the image processing apparatus 50.

Additionally, the display unit 53 is assumed as a display unit for displaying SDR images, or the SDR display unit 53 with the image display characteristic corresponding to the γ 2.2-th power curve described above with reference to FIG. 2 to FIG. 4.

The image signal processing unit 51 decodes an encoded image signal input as reception data from a broadcast station or reproduction data from an information recording medium such as Blu-ray (trademark) disc (BD), for example, and inputs a decoded image signal into the display control unit 52.

Additionally, FIG. 7 illustrates an I/O characteristic of the decoded image signal input into the display control unit 52 as I/O characteristic [S1].

The I/O characteristic [S1] is a signal with a characteristic corresponding to the γ correction signal 102 described above with reference to FIG. 3. That is, it is a signal according to the (1/2.2)-th power curve with the reverse characteristic to the γ 2.2-th power curve.

Additionally, the I/O characteristic [S1] illustrated in FIG. 7 is in the correspondence of $y=x^{(1/2.2)}$ assuming x (input) and y (output).

Additionally, the input corresponds to a signal value with a predetermined bit length and the output corresponds to a luminance value or color value displayed on the display unit.

Data input from the image signal processing unit 51 into the display control unit 52 is a signal value with a predetermined bit length corresponding to x (input) on the horizontal axis in the I/O characteristic [S1] illustrated in FIG. 7

As illustrated in FIG. 7, the display control unit 52 has a color signal conversion unit 201, a level conversion unit 202, a γ linear conversion unit 203, a display unit-compliant color gamut conversion unit 204, and a linear γ conversion unit 205.

A processing for a signal value with predetermined bits corresponding to x (input) on the horizontal axis in the I/O characteristic [S1] illustrated in FIG. 7 is performed in each of the processing units. In the processings, the I/O characteristic [S1] illustrated in FIG. 7 changes over I/O characteristics [S1] to [S6] as illustrated in FIG. 7.

A signal value corresponding to x (input) on the horizontal axis of the signal with the I/O characteristic [S6] is finally input into the display unit 53.

The processings in the respective components in the display control unit 52 will be sequentially described below.

The color signal conversion unit 201 converts YCbCr signals output from the image signal processing unit 51 into RGB signals.

Additionally, the processing is exemplary in a case where output signals of the color signal conversion unit 201 are YCbCr signals.

In a case where output signals of the color signal conversion unit 201 are RGB signals, the processing in the color signal conversion unit 201 is omitted.

The present embodiment will be described assuming that signals output from the image signal processing unit 51 are YCbCr signals.

Additionally, the image signal processing unit 51 outputs three signals Y, Cb, and Or to the color signal conversion unit 201.

The image signal processing unit 51 outputs signals with the I/O characteristic [S1] illustrated in FIG. 7, or three image signals (Y, Cb, Cr) with the I/O characteristic according to the (1/2.2)-the power curve to the color signal conversion unit 201.

Additionally, the I/O characteristic [S1] illustrated in FIG. 7 is the I/O characteristic of $y=x^{(1/2.2)}$ assuming x (input) and y (output).

The color signal conversion unit 201 converts the YCbCr signals output from the image signal processing unit 51 into RGB signals.

The color signal conversion unit 201 generates and outputs three color signals RGB to the level conversion unit 202 on the basis of the YCbCr signals output from the image signal processing unit 51.

The color signal conversion unit 201 outputs signals with the I/O characteristic [S2] illustrated in FIG. 7, or three image signals (R, G, B) with the characteristic according to the (1/2.2)-th power curve similar to the I/O characteristic [S1] to the level conversion unit 202.

The I/O characteristic [S2] illustrated in FIG. 7 is the I/O characteristic of $y=x^{(1/2.2)}$ assuming x (input) and y (output) similarly to the I/O characteristic [S1].

The level conversion unit 202 performs a level conversion processing on the RGB signals input from the color signal conversion unit 201.

For example, in a case where a pixel value range capable of being set for each of the signals R, G, and B is between 0 and 255, a signal value of 0 to 1.0, which is obtained by cutting the following low pixel value region and high pixel value region and extracting only the intermediate region, is set and output to the γ linear conversion unit 203.

Low pixel value region of 0 to 15

High pixel value region of 236 to 255

The cutting processing is directed for eliminating the low pixel value region with many noises and the high pixel value region close to a saturation pixel value.

The level conversion unit 202 outputs signals with the I/O characteristic [S3] illustrated in FIG. 7, or three image signals (R, G, B) according to the (1/2.2)-th power curve to the γ linear conversion unit 203.

Additionally, the I/O characteristic [S3] illustrated in FIG. 7 is the I/O characteristic of $y=x^{(1/2.2)}$ assuming x (input) and y (output) similarly to the I/O characteristics [S1] and [S2].

The γ linear conversion unit 203 performs a γ linear conversion processing on the RGB signals input from the level conversion unit 202.

The RGB signals input from the level conversion unit 202 are three image signals (R, G, B) according to the I/O characteristic [S3] illustrated in FIG. 7 or the (1/2.2)-th power curve.

The γ linear conversion unit 203 performs a (2.2-th power) processing on the three image signals (R, G, B) according to the (1/2.2)-th power curve, and generates signals (input signals corresponding to the x axis) with the I/O characteristic [S4] in a linear correspondence. The γ linear conversion processing is performed.

Additionally, the I/O characteristic [S3] illustrated in FIG. 7 is in the correspondence of $y=x^{(1/2.2)}$ assuming x (input) and y (output), and the γ linear conversion unit 203 performs the (2.2-th power) processing on the three image signals (R, G, B) according to the (1/2.2)-th power curve. That is, $y=(x^{(1/2.2)})^{2.2}$ is established.

With the calculation processing, y=x is established.

The signals (input signals x corresponding to the x axis) in the linear relationship between x (input) and y (output) or with the I/O characteristic [S4] are generated.

The γ linear conversion unit 203 generates the signals with the I/O characteristic [S4] illustrated in FIG. 7 in the γ linear conversion processing. That is, the three image signals (R, G, B) in which the I/O values linearly correspond to each other are output to the display unit-compliant color gamut conversion unit 204.

Additionally, the I/O characteristic [S4] illustrated in FIG. 7 is in the linear correspondence of y=x assuming x (input) and y (output).

The display unit-compliant color gamut conversion unit 204 performs a color gamut conversion processing on the RGB signals input from the γ linear conversion unit 203.

The color gamut conversion processing is directed for converting the color gamut of an input image into the color gamut displayable on the display unit 53.

For example, a 3×3 matrix previously stored in a memory is applied as conversion matrix for the display unit 53 thereby to perform the color gamut conversion on each of the colors RGB.

Additionally, with the color gamut conversion, the linear relationship of the I/O characteristic, or the linearity of signal value and luminance, for example, is kept as it is.

The display unit-compliant color gamut conversion unit 204 generates signals with the I/O characteristic [S5] illustrated in FIG. 7 in the color gamut conversion processing. That is, three image signals (R, G, B) in which the I/O values linearly correspond to each other are output to the linear γ conversion unit 205.

The I/O characteristic [S5] illustrated in FIG. 7 is in the linear correspondence of y=x assuming x (input) and y (output) similarly to the I/O characteristic [S4].

The linear γ conversion unit 205 performs a linear γ conversion processing on the RGB signals input from the display unit-compliant color gamut conversion unit 204.

The RGB signals input from the display unit-compliant color gamut conversion unit 204 are signals with the I/O characteristic [S5] illustrated in FIG. 7, or three image signals (R, G, B) in a linear relationship between input and output (luminance value and color value).

The linear γ conversion unit 205 performs a (1/2.2)-th power processing on the three image signals (R, G, B) in the linear relationship, and performs the linear γ conversion processing for setting the I/O characteristic according to the (1/2.2)-th power curve as illustrated in the I/O characteristic [S6] in FIG. 7.

The I/O characteristic [S6] illustrated in FIG. 7 is the I/O characteristic of $y=x^{(1/2.2)}$ assuming x (input) and y (output).

The linear γ conversion unit 205 generates a γ correction signal for the SDR display unit 53 in the linear γ conversion processing. The γ correction signal is a (1/2.2)-th power curve similar to the γ correction signal input from the image processing unit 51 and has a reverse characteristic to the 2.2-th power curve as the display characteristic of the SDR display unit 53.

Figure 8:
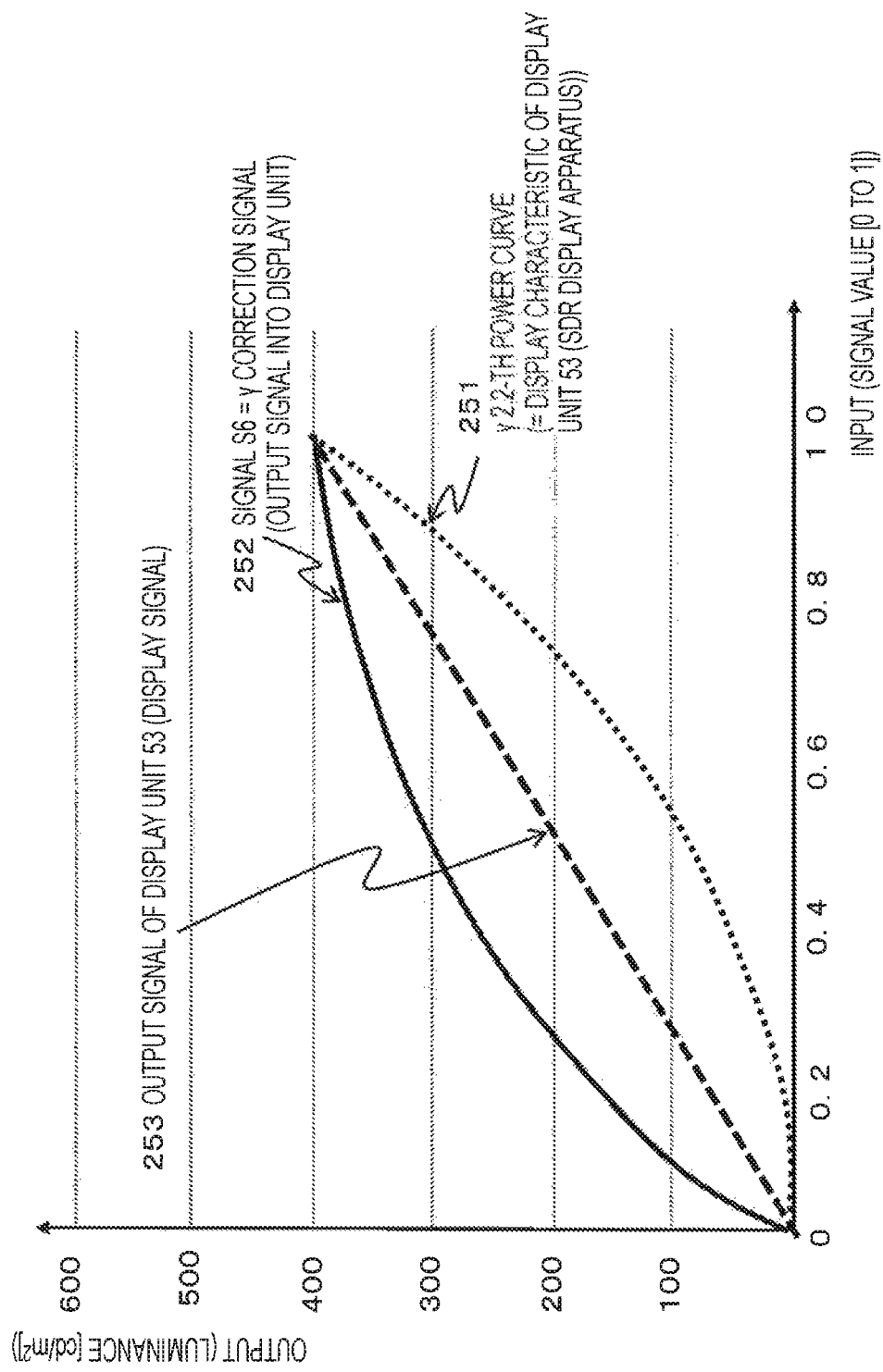
FIG. 8 is a diagram for explaining the processings for SDR image in the image processing apparatus.

An exemplary display signal displayed on the SDR display unit 53 will be described with reference to FIG. 3. FIG. 8 is a diagram similar to FIG. 3 described above.

The processing described with reference to FIG. 7 is a processing of inputting signals (signals corresponding to the horizontal axis (x)) with the I/O characteristic [S6] generated by the linear γ conversion, unit 205 illustrated in FIG. 7 into the SDR display unit 53 with an I/O characteristic expressed in a γ 2.2-th power curve 251 illustrated in FIG. 8.

The I/O characteristic [S6] is a reverse characteristic to the γ 2.2-th power curve 251 illustrated in FIG. 8, or a characteristic corresponding to a γ correction signal 252.

In this way, the signals with the I/O characteristic [S6] reverse to the γ 2.2-th power curve, or the γ correction signal 252 in the (1/2.2)-th power curve is input in the SDR display unit 53 with the I/O characteristic expressed in the γ 2.2-th power curve 251, thereby obtaining output 253 of the display unit in which the display signal (output) of the display unit such as luminance value and color value is linear to the input signal.

The display unit output is performed by use of the γ correction signal in this way, so that the linear relationship between input signal and output signal (luminance value and color value) is kept, and a SDR image displayed on the SDR display unit can correctly express luminance and color of the original input SDR image.

3-2. Input Signal Generation Processing in Display Unit for Processing HDR Image An input signal generation processing in the display unit will be described below in a case where an image to be processed in the image processing apparatus 50 is a HDR image.

Figure 9:
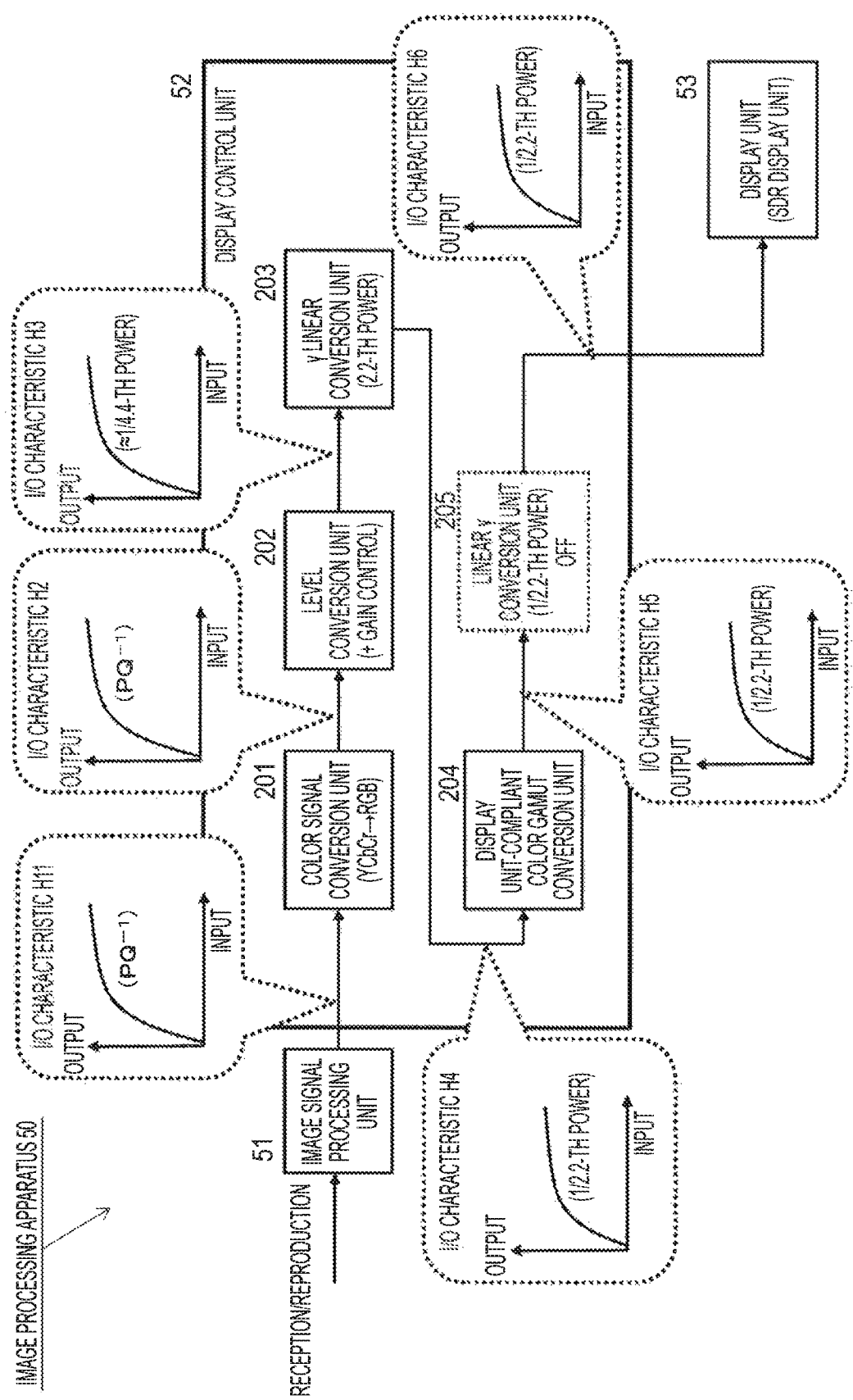
FIG. 9 is a diagram for explaining the processings for HDR image in the image processing apparatus.

FIG. 9 is a diagram for explaining the processings for HDR image performed by the display control unit 52 in the image processing apparatus 50.

Additionally, the display unit 53 is a display unit for displaying SDR images, or the SDR display unit 53 with the image display characteristic corresponding to the γ 2.2-th power curve described above with reference to FIG. 2 to FIG. 4.

The image signal processing unit 51 decodes an encoded image signal input as reception data from a broadcast station or reproduction data from an information recording medium such as Blu-ray (trademark) disc (BD), for example, and generates an output signal into the display control unit 52.

The output signal has sin I/O characteristic [H1] illustrated in FIG. 9.

The I/O characteristic [H1] is a signal with a reverse characteristic to the SMPTE ST 2084 curve (PQ curve) described above with reference to FIG. 4. That is, it is a signal with the characteristic for HDR image according to the ($PQ^{-1}$) curve with the I/O characteristic reverse to the PQ curve.

The display control unit 52 illustrated in FIG. 9 has the color signal conversion unit 201, the level conversion unit 202, the γ linear conversion unit 203, the display unit-compliant color gamut conversion unit 204, and the linear γ conversion unit 205 similarly to the display control unit 52 described with reference to FIG. 7.

The display control unit 52 illustrated in FIG. 9 performs different processings between in a case where a signal to be processed is a HDR image signal and in a case where a signal to be processed is a SDR image signal.

The display control unit 52 in the image processing apparatus 50 determines whether an image signal input from the image signal processing unit 51 is a HDR image signal or a SDR image signal on the basis of metadata added to the image signal, for example. The processing form is changed on the basis of the determination result.

The processings in a case where an input image is a HDR image will be described below in detail.

The color signal conversion unit 201 converts YCbCr signals output from the image signal processing unit 51 into RGB signals.

Additionally, the processing is exemplary in a case where output signals of the color signal conversion unit 201 are YCbCr signals similarly as described above with reference to FIG. 7.

In a case where output signals of the color signal conversion unit 201 are RGB signals, the processing in the color signal conversion unit 201 is omitted.

The present embodiment will be described assuming that signals output from the image signal processing unit 51 are YCbCr signals.

Additionally, the image signal processing unit 51 outputs three signals Y, Cb, and Cr to the color signal conversion unit 201.

The image signal processing unit 51 outputs signals with the I/O characteristic [H1] illustrated in FIG. 9, or three image signals (Y, Cb, Cr) with the I/O characteristic according to the ($PQ^{-1}$) curve to the color signal conversion unit 201.

Additionally, the I/O characteristic [H1] illustrated in FIG. 9 is a HDR image-specific characteristic in an xy correspondence according to the ($PQ^{-1}$) curve described above with reference to FIG. 6 assuming x (input) and y (output).

That is, it is a reverse characteristic to the SMPTE ST 2084 curve (PQ curve) 120 described above with reference to FIG. 4.

The color signal conversion unit 201 converts the YCbCr signals output from the image signal processing unit 51 into RGB signals.

The color signal conversion unit 201 generates and outputs three color signals RGB to the level conversion unit 202 on the basis of the YCbCr signals output from the image signal processing unit 51.

The color signal conversion unit 201 outputs signals with an I/O characteristic [H2] illustrated in FIG. 9, or three image signals (R, G, B) with the characteristic according to the ($PQ^{-1}$) carve to the level conversion unit 202.

Additionally, the I/O characteristic [H2] illustrated in FIG. 9 is a signal with the reverse characteristic to the SMPTE ST 2084 curve (PQ curve) described above with reference to FIG. 4 similarly to the I/O characteristic [H1]. That is, it is a signal with the HDR image-specific characteristic according to the ($PQ^{-1}$) curve with the I/O characteristic reverse to the PQ curve.

The level conversion unit 202 performs the level conversion processing on the RGB signals input from the color signal conversion unit 201.

For example, in a case where a pixel value range capable of being set for each of the signals R, G, and B is between 0 and 255, a signal value of 0 to 1.0, which is obtained by cutting the following low pixel value region and high pixel value region and extracting only the intermediate region, is set and output to the γ linear conversion unit 203.

Low pixel value region of 0

High pixel value region of 255

The cutting processing is directed for eliminating the low pixel value region with many noises and the high pixel value region close to a saturation pixel value. Incidentally, both the low luminance region and the high luminance region are set to be accurately reproduced and the cut region is narrower in the HDR image than in the SDR image described above.

The level conversion unit 202 further performs gain control of multiplying a signal value of 0 to 1.0 obtained by cutting the low region and the high region and extracting only the intermediate region by a predetermined gain value as HDR image-specific processing.

Specifically, a gain adjustment processing of multiplying the signal value of 0 to 1.0 by the gain value of 5.1027× power (Luminance−0.207) is performed.

Additionally, Luminance is luminance of the display unit, or input luminance.

In the gain adjustment processing, the level conversion unit 202 generates and outputs signals with an I/O characteristic [H3] illustrated in FIG. 9, or three image signals (R, G, B) with an I/O characteristic according to a (1/4.4)-th power curve to the γ linear conversion unit 203.

The gain value multiplication processing is performed as a processing of converting the I/O characteristic [H2] according to the ($PQ^{-1}$) curve illustrated in FIG. 9 into the I/O characteristic [H3] according to the (1/4.4)-th power curve.

The γ linear conversion unit 203 performs the γ linear conversion processing on the RGB signals input from the level conversion unit 202.

The RGB signals input from the level conversion unit 202 are three image signals (R, G, B) with the I/O characteristic [H3] illustrate in FIG. 9 or the I/O characteristic according to the (1/4.4)-th power curve.

The I/O characteristic [H3] illustrated in FIG. 9 is in the correspondence of $y=x^{(1/4.4)}$ assuming x (input) and y (output).

The γ linear conversion unit 203 performs the (2.2-th power) processing on the three image signals (R, G, B) with the I/O characteristic according to the (1/4.4)-th power curve, and generates signals with an I/O characteristic [H4]

That is, not the linear conversion for assuming an I/O characteristic in a linear relationship but the processing of changing an I/O characteristic from the (1/4.4)-th power curve to the (1/2.2)-th power curve is performed on a HDR image.

Additionally, the I/O characteristic [H3] illustrated in FIG. 9 is in the correspondence of $y=x^{(1/4.4)}$ assuming x (input) and y (output), and the γ linear conversion unit 203 performs the (2.2-th power) processing on the three image signals (R, G, B) with the characteristic according to the (1/4.4)-th power curve. That is, $y=(x^{(1/4.4)})^{2.2}$ is established.

In the calculation processing, $y=(x^{1/2.2})$ is established.

The signals with the I/O characteristic [H4] for x (input) and y (output) are generated. That is, the signals with the I/O characteristic [H4] in the correspondence between the I/O values according to the (1/2.2)-th power curve are generated.

The γ linear conversion unit 203 generates signals with the I/O characteristic [H4] illustrated in FIG. 9 in the γ linear conversion processing. That is, three image signals (R, G, B) in the correspondence between the I/O values according to the (1/2.2)-th power curve are output to the display unit-compliant color gamut conversion unit 204.

Additionally, the I/O characteristic [H4] illustrated in FIG. 9 is in the correspondence of $y=(x^{(1/2.2)})$ assuming x (input) and y (output).

The display unit-compliant color gamut conversion unit 204 performs the color gamut conversion processing on the RGB signals input from the γ linear conversion unit 203.

The color gamut conversion processing is directed for converting the color gamut of an input image into the color gamut displayable on the display unit 53.

For example, a 3×3 matrix previously stored in a memory is applied as conversion matrix for the display unit 53 thereby to perform the color gamut conversion on each of the colors RGB.

Additionally, in the color gamut conversion, an I/O characteristic relationship such as an I/O characteristic between signal value and luminance is kept as it is.

The display unit-compliant color gamut conversion unit 204 generates signals with an I/O characteristic [H5] illustrated in FIG. 9 in the color gamut conversion processing. That is, three image signals (R, G, B) in a correspondence between the I/O values according to the (1/2.2)-th power curve are output to the linear γ conversion unit 205.

The I/O characteristic [H5] illustrated in FIG. 9 is in the correspondence of $y=(x^{(1/2.2)})$ assuming x (input) and y (output) similarly to the I/O characteristic [H4].

In a case where an image to be processed is a HDR image, the linear γ conversion unit 205 outputs input signals to the display unit (SDR display unit) 53 as it is without any processing.

As described above with reference to FIG. 7, in a case where an image to be processed is a SDR image, there is performed the linear γ conversion of converting the I/O characteristic [S5] in the linear relationship into the I/O characteristic [S6] according to the (1/2.2)-th power curve.

However, in a case where an image to be processed is a HDR image, the linear γ conversion unit 205 outputs input signals to the display unit (SDR display unit) 53 as it is without any processing.

The RGB signals input from the display unit-compliant color gamut conversion unit 204 are signals with the I/O characteristic [H5] illustrated in FIG. 9, or three image signals (R, G, B) with the I/O characteristic according to the (1/2.2)-th power curve.

The linear γ conversion unit 205 outputs the three image signals (R, G, B) to the display unit (SDR display unit) 53 as it is.

An I/O characteristic [H6] illustrated in FIG. 9 is in the correspondence of $y=x^{(1/2.2)}$ assuming x (input) and y (output).

The signals output from the linear γ conversion unit 205 to the display unit 53 have a similar characteristic to the γ correction signal for the SDR display unit 53 with a γ value of 2.2. That is, the signals have a similar I/O characteristic to the γ correction signal for the SDR display unit, which is a (1/2.2)-th power curve and has the reverse characteristic to the 2.2-th power curve as the display characteristic of the SDR display unit 53.

An exemplary display signal displayed on the SDR display unit 53 will be described with reference to FIG. 10.

The signals with the I/O characteristic [H6] are input from the linear γ conversion unit 205 illustrated in FIG. 9 into the SDR display unit 53 with the I/O characteristic expressed by the γ 2.2-th power curve 251 illustrated in FIG. 10 in the processings described with reference to FIG. 9.

Figure 10:
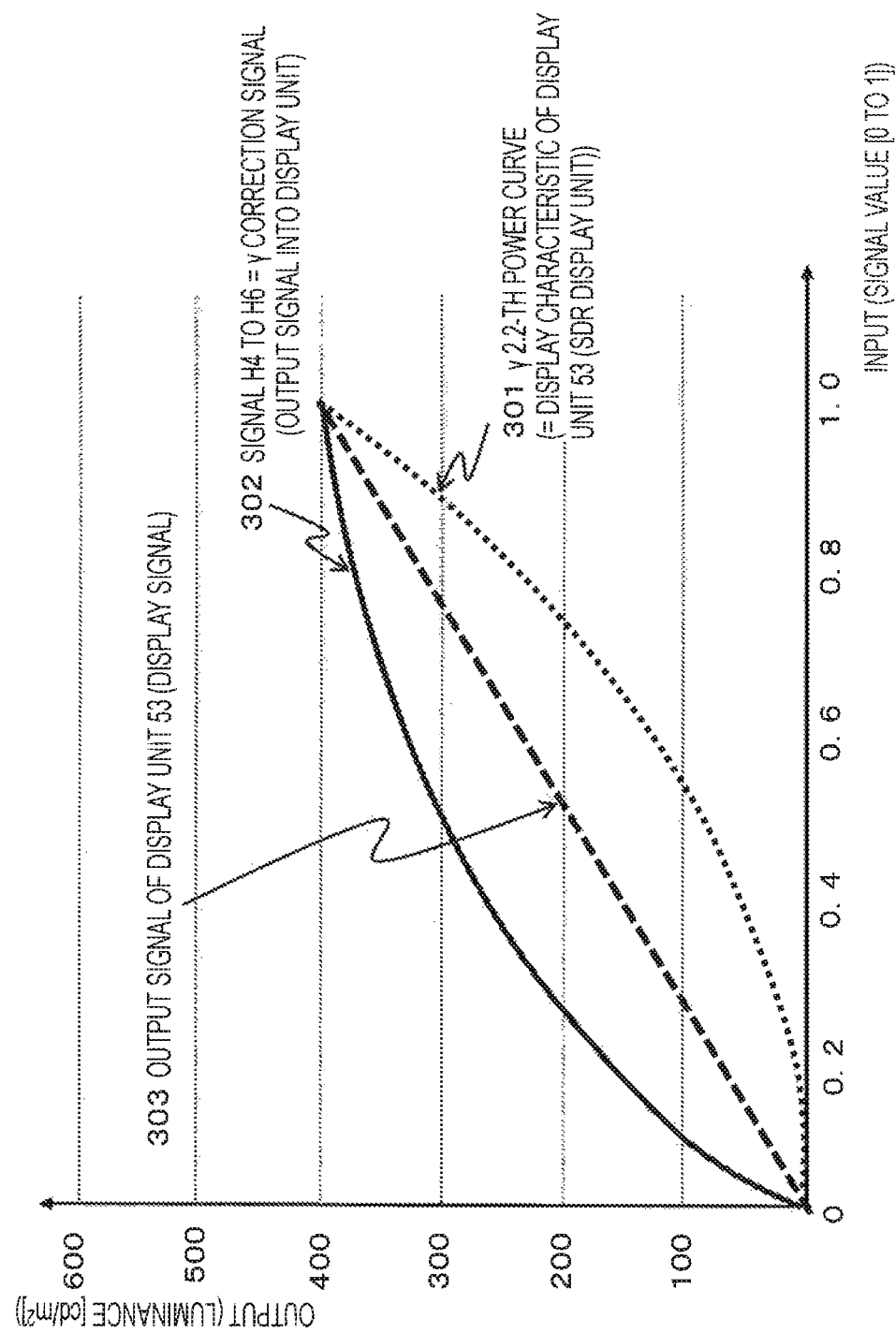
FIG. 10 is a diagram for explaining the processings for HDR image in the image processing apparatus.

The I/O characteristic [H6] is a reverse characteristic to a γ 2.2-th power curve 301 illustrated in FIG. 10, or an I/O characteristic corresponding to a γ correction signal 302 according to the (1/2.2)-th power curve for the SDR display apparatus with a γ value of 2.2.

In this way, the γ correction signal 302 with the I/O characteristic [H6] reverse to the γ 2.2-th power curve or the characteristic according to the (1/2.2)-th power curve is input into the SDR display unit 53 with the I/O characteristic expressed by the γ 2.2-th power curve 301, thereby obtaining output 303 of the display unit in which the display signal (output) of the display unit such as luminance value and color value is linear to the input signal.

That is, even if an image to be processed is a HDR image, the processings according to the present disclosure are applied so that the output 303 of the display unit in which luminance value and color value are linear to the input signal can be obtained in the SDR display apparatus and the HDR image displayed on the SDR display unit can correctly express luminance and color of the original input HDR image.

The I/O characteristic [H6] of the signals output by the linear γ conversion unit 205 in FIG. 9 is similar to the I/O characteristics [H4] and [H5] illustrated in FIG. 9. That is, a signal generated by the γ linear conversion unit 203 illustrated in FIG. 10 is set as a γ correction signal for the SDR display unit 53 or an I/O characteristic according to the (1/2.2)-th power curve.

As can be understood from the I/O characteristics [H1] to [H6] illustrated in FIG. 9, the output signals of the color signal conversion unit 201 have the I/O characteristic [H2] according to the (PQ$^{-1}$) curve similar to the γ correction curve for HDR image.

The signals with the I/O characteristic [H2] according to the (PQ$^{-1}$) curve similar to the γ correction curve for HDR image are converted into signals with the I/O characteristic [H4] according to the (1/2.2)-th power curve similar to the γ correction curve for SDR image in the later processings of the level conversion unit 202 and the γ linear conversion unit 203. The signal conversion processing is performed thereby to enable a display image with an I/O characteristic in a linear correspondence to be output on the SDR display unit 53.

The processings in the level conversion unit 202 and the γ linear conversion unit 203 will be described again.

The level conversion unit 202 performs the gain control of multiplying a signal value of 0 to 1.0 obtained by cutting the low region and the high region and extracting only the intermediate region by a predetermined gain value as HDR image-specific processing as described above.

Specifically, the gain adjustment processing of multiplying the signal value of 0 to 1.0 by the gain value of 5.1027×power (Luminance−0.207) is performed.

Additionally, Luminance indicates luminance of the display unit or input luminance.

In the gain adjustment processing, the level conversion unit 202 generates and outputs signals with the I/O characteristic [H3] illustrated in FIG. 9, or signals with the I/O characteristic [H3] according to the (1/4.4)-th power curve to the γ linear conversion unit 203.

The γ linear conversion unit 203 performs the (2.2-th power) processing on the signals with the I/O characteristic [H3] according to the (1/4.4)-th power curve input from the level conversion unit 202, and generates signals with the I/O characteristic [H4] according to the (1/2.2)-th power curve.

That is, not the linear conversion for assuming an I/O characteristic in a linear relationship but the processing of changing an I/O characteristic from the (1/4.4)-th power curve to the (1/2.2)-th power curve is performed on a HDR image.

The I/O characteristic [H3] illustrated in FIG. 9 is in the correspondence of $y=x^{(1/4.4)}$ assuming x (input) and y (output), and the γ linear conversion unit 203 performs the (2.2-th power) processing on the signals with the characteristic according to the (1/4.4)-th power curve. That is, $y=(x^{(1/4.4)})^{2.2}$ is established.

In the calculation processing, $y=(x^{(1/2.2)})$ is established. The signals with the I/O characteristic [H4] for x (input) and y (output) are generated.

The γ linear conversion unit 203 generates the signals with the I/O characteristic [H4] illustrated in FIG. 9 in the γ linear conversion processing. That is, signals in a correspondence between the I/O values according to the (1/2.2)-th power curve are generated.

The I/O characteristic does not change in the later processings of the display unit-compliant color gamut conversion unit 204, and additionally the linear γ conversion unit 205 does not perform any processing on the HDR image in a later step.

Consequently, the signals with the I/O characteristic [H6] (similar characteristic to [H4] and [H5]) according to the (1/2.2)-th power curve generated in the processings of the level conversion unit 202 and the γ linear conversion unit 203 are input into the display unit (SDR display unit) 53.

Output signals of the color signal conversion unit 201 illustrated in FIG. 9 have the I/O characteristic [H2] according to the $(PQ^{-1})$ curve similar to the γ correction curve for HDR image.

The signals with the I/O characteristic [H2] according to the $(PQ^{-1})$ curve similar to the γ correction curve for HDR image are converted into signals with the I/O characteristic [H4] according to the (1/2.2)-th power curve similar to the γ correction curve for SDR image in the later processings of the level conversion unit 202 and the γ linear conversion unit 203.

The meaning of the conversion processing will be described with reference to FIG. 11.

Figure 11:
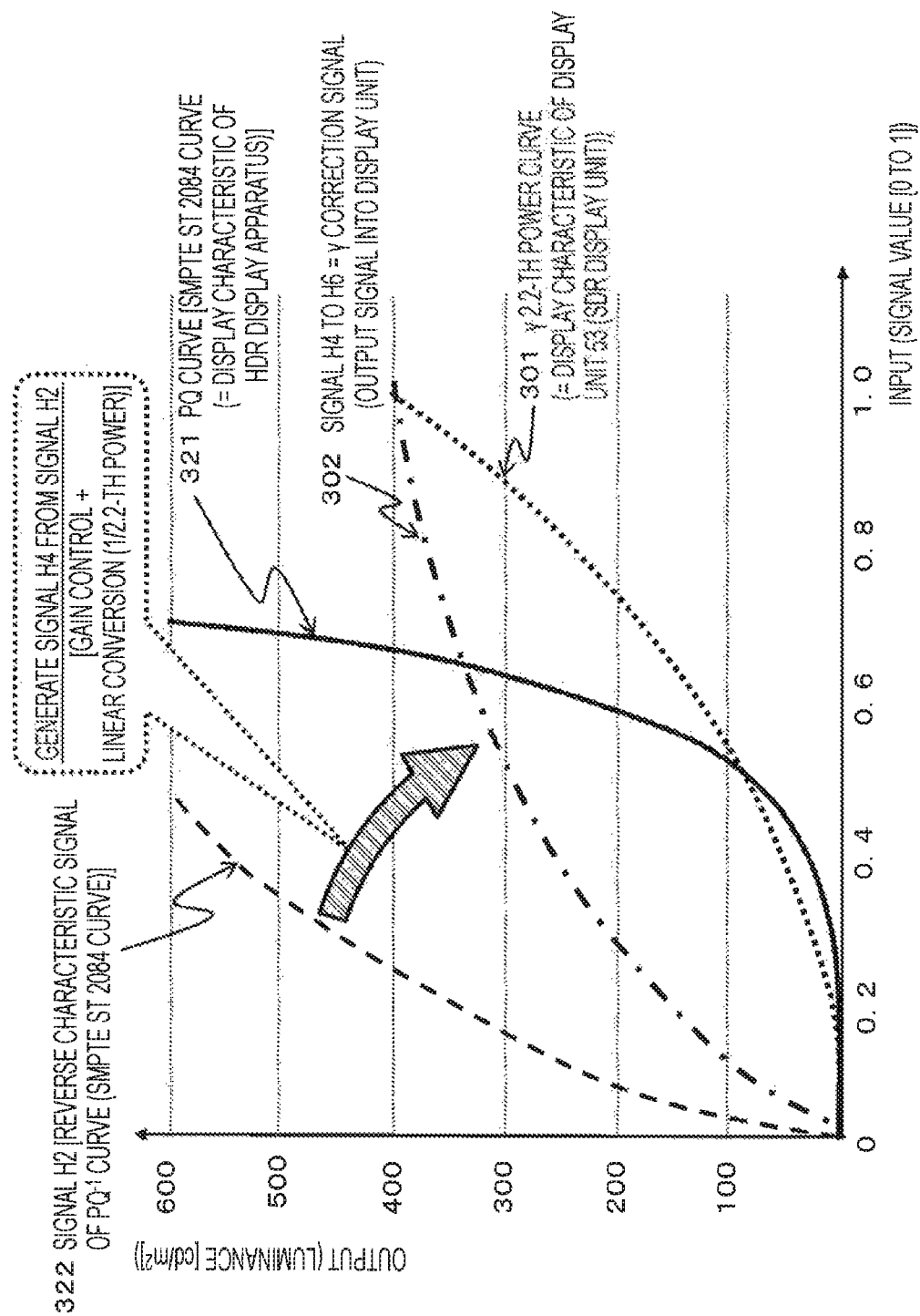
FIG. 11 is a diagram for explaining the processings for SDR Image in the image processing apparatus.

FIG. 11 illustrates the γ 2.2-th power curve 301 corresponding to the display characteristic of the SDR display unit and the γ correction signal 302 for SDR image with a reverse characteristic thereto.

Further, FIG. 11 illustrates a PQ curve (SMPTE ST 2084 curve) 321 corresponding to the image characteristic of HDR image and a $PQ^{-1}$ curve 322 corresponding to a γ correction curve for HDR image.

The $PQ^{-1}$ curve 322 has an I/O characteristic corresponding to the I/O characteristic [H2] of the signals output by the color signal conversion unit 201 in FIG. 9.

Further, the γ correction signal 302 for SDR image has a similar characteristic to the I/O characteristic [H4] of the signals output by the γ linear conversion unit 203 in FIG. 9.

That is, the level conversion unit 202 and the γ linear conversion unit 203 perform the processings (signal conversion processings in arrow illustrated in FIG. 11) of converting the $PQ^{-1}$ curve 322 corresponding to the I/O characteristic [H2] of the signals output by the color signal conversion unit 201 into the signals with the similar I/O characteristic [H4] to the γ correction signal 302 for SDR image.

The conversion processings are realized by the gain adjustment on the signal value in the level conversion unit 202 and the 2.2-th power processing on the signal value in the γ linear conversion unit 203.

In the processings, even in a case where an input image signal is a HDR image, the signals with the I/O characteristic according to the (1/2.2)-th power curve corresponding to the γ correction curve for SDR image can be generated and input into the SDR display unit.

As a result of the processing, the linear I/O characteristic can be displayed, and an image almost accurately expressing luminance and color of the original HDR image can be output.

Additionally, the above-described embodiment has been explained assuming the γ value of the display unit (SDR display unit) 53 at 2.2, but the processings according to the present disclosure are applicable to the display unit with other γ value of 2.4, for example.

There may be configured such that the processing forms in the level conversion unit 202 and the γ linear conversion unit 203 are changed depending on the γ value of the display unit thereby to generate a γ correction signal with a reverse characteristic to a γ curve as a display unit characteristic.

4. Processing Sequence of Display Control Unit

A processing sequence performed by the display control unit 52 in the image processing apparatus according to the present disclosure will be described below with reference to a flowchart illustrated in FIG. 12.

Figure 12:
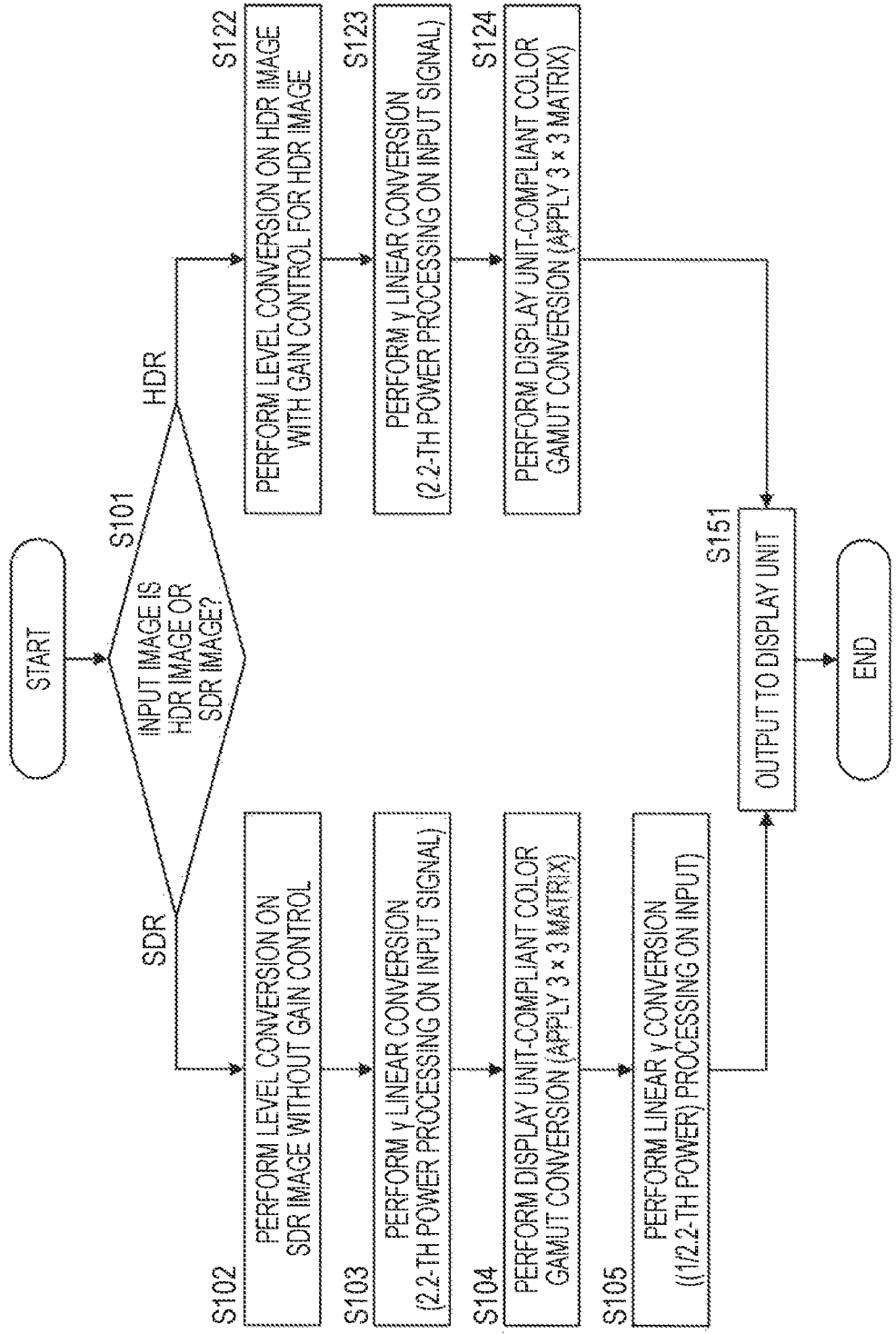
FIG. 12 is a flowchart for explaining a processing sequence in the image processing apparatus.

Additionally, the processings in the flow illustrated in FIG. 12 are performed as the processings of the display control unit described with reference to FIG. 7 and FIG. 9.

Additionally, the processings can be performed according to a program stored in a memory in the image processing apparatus, for example. In this case, the processings are performed under control of the control unit including a CPU or the like having a program execution function.

The processing in each step illustrated in the flow of FIG. 12 will be sequentially described below.

Step S101

At first, the display control unit 52 determines whether an image to be processed input into the display control unit 52 is a HDR image or SDR image. In the image determination processing, the determination is made with reference to attribute information (metadata) input for the input image. Alternatively, there may be configured such that the display control unit 52 performs an analysis processing on the input image thereby to make the determination.

In a case where the input image is a SDR image, the processings in steps S102 to S105 are performed.

On the other hand, in a case where the input image is a HDR image, the processings in steps S122 to S124 are performed.

Additionally, the processings of the color signal conversion unit 201 illustrated in FIG. 7 and FIG. 9 are omitted in the following description. This is because the color signal conversion unit 201 performs the common processings for both SDR image and HDR image and can be omitted if input signals are RGB signals.

The processings in steps S102 to S105 in a case where the input image is a SDR image will be first described.

Step S102

The processing in step S102 is a processing of the level conversion unit 202 illustrated in FIG. 7 and FIG. 9.

In a case where the input image is a SDR image, the level conversion unit 202 performs the level conversion on the SDR image without gain control.

As described above with reference to FIG. 7, the level conversion processing of setting a signal value of 0 to 1.0 obtained by cutting the low pixel value region and the high pixel value region and extracting only the intermediate region is performed, and the set level value is output to the γ linear conversion unit 203.

Signals generated in the processing of the level conversion unit 202 illustrated in FIG. 7 have the I/O characteristic [S3] illustrated in FIG. 7 or the I/O characteristic according to the (1/2.2)-th power curve.

Step S103

The processing in step S103 is a processing of the γ linear conversion unit 203 illustrated in FIG. 7 and FIG. 9.

The γ linear conversion unit 203 performs a similar processing both in a case where the input image is a SDR image and in a case where the input image is a HDR image.

The γ linear conversion unit 203 performs the (2.2-th power) processing on the signals with the characteristic according to the (1/2.2)-th power curve.

In a case where the input image is a SDR image, the I/O characteristic [S3] of the signals input into the γ linear conversion unit 203 is the I/O characteristic according to the (1/2.2)-th power curve as illustrated in FIG. 7.

The γ linear conversion unit 203 performs the (2.2-th power) processing on the signals with the characteristic [S3] according to the (1/2.2)-th power curve.

That is, $y=(x^{1/2.2})^{2.2}$ is established.

In the calculation processing, $y=x$ is established.

Signals in the linear relationship between x (input) and y (output) or with the I/O characteristic [S4] illustrated in FIG. 7 are generated.

Step S104

The processing in step S104 is a processing of the display unit-compliant color gamut conversion unit 204 illustrated in FIG. 7 and FIG. 9.

The display unit-compliant color gamut conversion unit 204 performs a similar processing both in a case where the input image is a SDR image and in a case where the input image is a HDR image.

The color gamut conversion processing is directed for converting the color gamut of the input image into the color gamut displayable on the display unit 53.

For example, a 3×3 matrix previously stored in a memory is applied as conversion matrix for the display unit 53 thereby to perform the color gamut conversion on each of the colors RGB.

Additionally, the linear relationship of the I/O characteristic such as linearity of signal value and luminance is kept as it is in the color gamut conversion.

The I/O characteristic [S5] illustrated in FIG. 7 is in the linear correspondence of y=x assuming x (input) and y (output) similarly to the I/O characteristic [S4].

Step S105

The processing in step S105 is a processing of the linear γ conversion unit 205 illustrated in FIG. 7 and FIG. 9.

The linear γ conversion unit 205 performs the processing only in a case where the input image is a SDR image, does not perform the processing in a case where the input image is a HDR image, and outputs the input signals to the display unit 53 as it is.

In a case where the input image is a SDR image, the linear γ conversion unit 205 performs the (1/2.2)-th power processing on the signals with the I/O characteristic [S5] in the linear correspondence illustrated in FIG. 7 input from the display unit-compliant color gamut conversion unit 204, and performs the linear γ conversion processing for the characteristic according to the (1/2.2)-th power curve as illustrated in the I/O characteristic [S6] in FIG. 7.

The I/O characteristic [S6] illustrated in FIG. 7 is the I/O characteristic of $y=x^{(1/2.2)}$ assuming x (input) and y (output).

The linear γ conversion unit 205 generates a γ correction signal for the SDR display unit 53 in the linear γ conversion processing. The γ correction signal is a (1/2.2)-th power curve and has a reverse characteristic to the 2.2-th power curve as the display characteristic of the SDR display unit 53.

Step S151

Finally, the signals with the I/O characteristic [S6] generated by the linear γ conversion unit 205 are output to the display unit (SDR display unit) 53.

The display unit (SDR display unit) 53 has the display characteristic corresponding to the γ 2.2-th power curve with a γ value or 2.2. The signals with the I/O characteristic [S6] according to the (1/2.2)-th power curve are input into the display unit 53 thereby to perform the display processing.

In the processing, the display unit output can be performed such that the display signal (output) of the display unit such as luminance value and color value is linear to the input signal.

The processings in a case where the input image is determined as HDR image in step S101, or the processings in and subsequent to step S122 will be described below.

Step S122

The processing in step S122 is a processing of the level conversion unit 202 illustrated in FIG. 7 and FIG. 9.

In a case where the input image is a HDR image, the level conversion unit 202 performs the level conversion on the HDR image with gain control.

As described above with reference to FIG. 9, a signal value of 0 to 1.0 obtained by cutting the low pixel value region and the high pixel value region and extracting only the intermediate region is set, and further the set level value is multiplied by a predetermined gain value.

Specifically, as described above, the gain adjustment processing of multiplying the signal value of 0 to 1.0 by the gain value of 5.1027×Power (Luminance−0.207) is performed.

Additionally, Luminance indicates luminance of the display unit or input luminance.

In the gain adjustment processing, the level conversion unit 202 generates signals with the I/O characteristic [H3] illustrated in FIG. 9, or signals with the I/O characteristic according to the (1/4.4)-th power curve, and outputs them to the γ linear conversion unit 203.

The multiplication of gain value is a processing of converting the I/O characteristic [H2] according to the ($PQ^{-1}$) curve illustrated in FIG. 9 into the I/O characteristic [H3] according to the (1/4.4)-th power curve.

Step S123

The processing in step S123 is a processing of the γ linear conversion unit 203 illustrated in FIG. 7 and FIG. 9.

The γ linear conversion unit 203 performs a similar processing both in a case where the input image is a SDR image and in a case where the input image is a HDR image.

The γ linear conversion unit 203 performs the (2.2-th power) processing on the signals with the characteristic according to the (1/2.2)-th power curve.

In a case where the input image is a HDR image, the I/O characteristic [H3] of the signals input into the γ linear conversion unit 203 is the I/O characteristic according to the (1/4.4)-th power curve as illustrated in FIG. 9.

The γ linear conversion unit 203 performs the (2.2-th power) processing on the signals with the characteristic [H3] according to the (1/4.4)-th power curve.

That is, $y=(x^{(1/4.4)})^{2.2}$ is established.

In the calculation processing, $y=x^{(1/2.2)}$) is established.

The signals with the I/O characteristic [H4] for x (input) and y (output) are generated. That is, signals with the I/O characteristic [H4] in the correspondence between the I/O values according to the (1/2.2)-th power curve are generated.

Step S124

The processing in step S124 is a processing of the display unit-compliant color gamut conversion unit 204 illustrated in FIG. 7 and FIG. 9.

The display unit-compliant color gamut conversion unit 204 performs a similar processing both in a case where the input image is a SDR image and in a case where the input image is a HDR image.

The color gamut conversion processing is directed for converting the color gamut of the input image into the color gamut displayable on the display unit 53.

For example a 3×3 matrix previously stored in a memory is applied as conversion matrix for the display unit 53 thereby to perform the color gamut conversion on each of the colors RGB.

Additionally, with the color gamut conversion, the I/O characteristic is kept as it is. That is, signals with the I/O characteristic [H5] in the correspondence between the I/O values according to the (1/2.2)-th power curve, which is similar to the I/O characteristic [H4], are generated.

In a case where the image to be processed is a HDR image, the processing of the linear γ conversion unit 205 illustrated in FIG. 7 and FIG. 9 is omitted.

That is, in a case where the image to be processed is a HDR image, the signals generated by the display unit-compliant color gamut conversion unit 204 are input into the display unit 53 as it is.

The I/O characteristic [H6] of the signals output from the linear γ conversion unit 205 illustrated in FIG. 9 is the same as the I/O characteristic [H5] of the signals generated by the display unit-compliant color gamut conversion unit 204, and has a correspondence between the I/O values according to the (1/2.2)-th power curve.

Step S151

Finally, the signals with the I/O characteristic [H5] (=[H6]) corresponding to the output of the display unit-compliant color gamut conversion unit 204 are output to the display unit (SDR display unit) 53.

The display unit (SDR display unit) 53 has the display characteristic corresponding to the γ 2.2-th power curve with a γ value of 2.2. The signals with the I/O characteristic [H6] according to the (1/2.2)-th power curve are input into the display unit 53 thereby to perform the display processing.

In the processing, the display unit output can be performed such that the display signal (output) of the display unit such as luminance value and color value is linear to the input signal.

5. Exemplary Configuration of Image Processing Apparatus

An exemplary configuration of the image processing apparatus for performing the processings according to the aforementioned embodiment will be described below with reference to FIG. 13.

The processings according to the aforementioned embodiment can be performed in various types of image processing apparatuses, and an exemplary hardware configuration of am image processing apparatus such as PC for performing the image processings will be described below.

Figure 13:
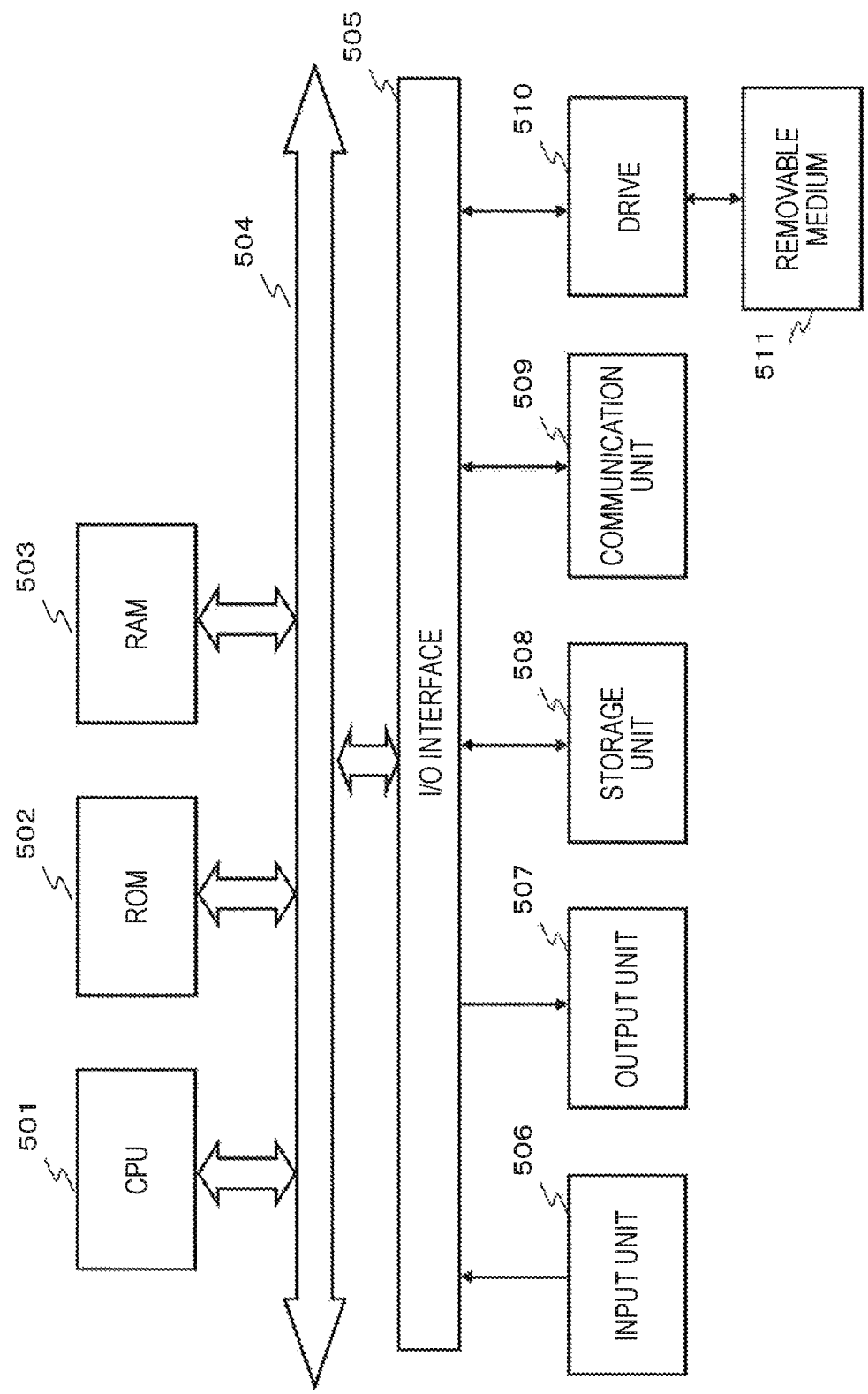
FIG. 13 is a diagram for explaining an exemplary configuration of an image processing apparatus according to the present disclosure.

FIG. 13 is a diagram illustrating an exemplary hardware configuration of an image processing apparatus such as PC.

A central processing unit (CPU) 501 functions as a data processing unit for performing various processings according to a program stored in a read only memory (ROM) 502 or a storage unit 508. For example, the processings in the sequence described according to the aforementioned embodiment are performed. Programs and data executed by the CPU 501 are stored in a random access memory (RAM) 503. The CPU 501, the ROM 502, and the RAM 503 are mutually connected via a bus 504.

The CPU 501 is connected to an I/O interface 505 via the bus 504, and the I/O interface 505 is connected with an input unit 506 configured of various switches, keyboard, mouse, microphone, and the like, and an output unit 5050 configured of display, speaker, and the like. The CPU 501 performs various processings in response to an instruction input from the input unit 506, and outputs a processing result to the output unit 507, for example.

The storage unit 508 connected to the I/O interface 505 is configured, of hard disc or the like, for example, and stores therein programs and various items of data executed by the CPU 501. A communication unit 509 functions as a data communication exchanging unit and a broadcast wave exchanging unit via a network such as Internet or local area network, and makes communication with an external apparatus.

A drive 510 connected to the I/O interface 505 drives a removable medium 511 including magnetic disc, optical disc, magnetooptical disc, or semiconductor memory such as memory card, and records or reads data.

6. Summary of Configuration of Present Disclosure

An embodiment according to the present disclosure has been described above in detail with reference to the specific embodiment. However, it is apparent that those skilled in the art can modify or substitute for the embodiment without departing from the spirit of the present disclosure. That is, the present invention has been disclosed in an exemplary form, and should not be limitedly interpreted. CLAIMS should be referred to in order to determine the spirit of the present disclosure.

Additionally, the technology disclosed in the present specification can take the following configurations.

(1) An image processing apparatus including:
a display control unit for inputting an image signal for a high dynamic range (HDR) image or a standard dynamic range (SDR) image and generating an output signal into a display unit,
in which the display unit is a SDR display unit with a γ value for SDR image, and
in a case where an input signal into the display control unit is a HDR image signal, the display control unit performs a processing of converting the input HDR image signal, and generates and outputs a converted HDR signal according to a γ correction curve with an I/O characteristic reverse to a γ curve corresponding to an I/O characteristic of the SDR display unit to the display unit.

(2) The image processing apparatus according to (1),
in which the γ value for the SDR image is 2.2, and the γ curve corresponding to the I/O characteristic of the SDR display unit is a 2.2-th power curve,
the γ correction curve is a (1/2.2)-th power curve with an I/O characteristic reverse to the γ curve, and
in a case where an input signal into the display control unit is a HDR image signal, the display control unit performs a processing of converting the input HDR image signal, and generates and outputs a converted HDR signal with an I/O characteristic according to the (1/2.2)-th power curve to the display unit.

(3) The image processing apparatus according to (1) or (2),
in which in a case where an input signal into the display control unit is a HDR image signal, the display control unit inputs the HDR image signal with an I/O characteristic according to a $(PQ^{-1})$ curve reverse to an I/O characteristic of a SMPTE STTS 2084 curve (PQ curve), and performs a signal conversion processing.

(4) The image processing apparatus according to any of (1) to (3),
in which the display control unit includes:
a level conversion unit for performing a level conversion processing on an input signal into the display control unit; and
a γ linear conversion unit for performing a signal conversion processing on the output of the level conversion unit,
in a case where an input signal into the display control unit is a HDR image signal, the level conversion unit performs a gain adjustment processing according to level conversion of the input HDR image signal, and
the γ linear conversion unit performs the signal conversion processing on the gain-adjusted HDR image signal, and generates the converted HDR signal.

(5) The image processing apparatus according to (4),
in which the γ curve corresponding to the I/O characteristic of the SDR display unit is a 2.2-th power curve,
the γ correction curve is a (1/2.2)-th power curve with an I/O characteristic reverse to the γ curve,
the level conversion unit generates a HDR image signal with an I/O characteristic according to a (1/4.4)-th power curve in the gain adjustment processing, and
the γ linear conversion unit performs a 2.2-th power processing on the gain-adjusted HDR image signal, and generates a converted HDR signal with an I/O characteristic according to the (1/2.2)-th power curve.

(6) The image processing apparatus according to (4) or (5),
in which the display control unit further includes a display unit-compliant color gamut conversion unit for performing a display unit-compliant color gamut conversion processing on the output from the γ linear conversion unit.

(7) The image processing apparatus according to (6),
in which the display control unit further includes a linear γ conversion unit for performing a signal conversion processing on the output from the display unit-compliant color gamut conversion unit.

(8) The image processing apparatus according to (7),
in which the linear γ conversion unit does not perform the processing in a case where an input signal into the display control unit is a HDR image signal, and performs the signal conversion processing only in a case where an input signal is a SDR image signal.

(9) The image processing apparatus according to any of (1) to (8),
in which the display control unit further includes a color signal conversion unit for performing a color signal conversion processing on an input signal into the display control unit.

(10) An image processing method performed in an image processing apparatus,
in which the image processing apparatus includes a display control unit for inputting an image signal for a high dynamic range (HDR) image or a standard dynamic range (SDR) image and generating an output signal into a display unit,
the display unit is a SDR display unit with a γ value for SDR image, and
in a case where an input signal into the display control unit is a HDR image signal, the display control unit performs a processing of converting the input HDR image signal, and generates and outputs a converted HDR signal according to a γ correction curve with an I/O characteristic reverse to a γ carve corresponding to an I/O characteristic or the SDR display unit to the display unit.

(11) A program for causing an image processing apparatus to perform an image processing,
in which the image processing apparatus includes a display control unit for inputting an image signal for a high dynamic range (HDR) image or a standard dynamic range (SDR) image and generating an output signal into a display unit,
the display unit is a SDR display unit with a γ value for SDR image, and
in a case where an input signal into the display control unit is a HDR image signal, the program causes the display control unit to perform a processing of converting the input HDR image signal, and to generate and output a converted HDR signal according to a γ correction curve with an I/O characteristic reverse to a γ curve corresponding to an I/O characteristic of the SDR display unit to the display unit.

A series of processings described in the specification can be performed in hardware, in software, or in a composite configuration of both. In a case where the processings are performed in software, a program recording the processing sequence can be installed and executed in a memory in a computer incorporated in dedicated hardware, or the program can be installed and executed in a general-purpose computer capable of performing various processings. For example, the program can be previously recorded in a recoding medium. The program can be installed from a recoding medium into a computer, and additionally the program can be received via a network such as local area network (LAN) or Internet and can be installed in a recording medium such as incorporated hard disc, Additionally, various processings described in the specification may be performed in time series according to the description, and additionally may be performed in parallel depending on the processing capability of an apparatus for performing the processings or as needed. Additionally, a system in the present specification indicates a logically-collective configuration of apparatuses, and the apparatuses in each configuration may not necessarily be present in the same casing.

INDUSTRIAL APPLICABILITY

As described above, an apparatus and method capable of displaying a HDR image on a SDR display apparatus without a large deterioration in image quality are realized with the configuration according to one embodiment of the present disclosure.

Specifically, the apparatus has a display control unit for converting a HDR image signal and generating an output signal into a display unit. In a case where a HDR image signal is input, the display control unit performs an input HDR image signal conversion processing, and generates and outputs a converted HDR signal according to a γ correction curve with a reverse I/O characteristic to a γ curve corresponding to an I/O characteristic of a SDR display unit to the display unit. In a case where the γ curve corresponding to the I/O characteristic of the SDR display unit is a 2.2-th power curve, the display control unit performs the input HDR image signal conversion processing, and generates and outputs a converted HDR signal with an I/O characteristic according to a (1/2.2)-th power curve to the display unit.

An apparatus and method capable of displaying a HDR image on a SDR display apparatus without a large deterioration in image quality are realized in the processings according to the present disclosure.

REFERENCE SIGNS LIST

50: Image processing apparatus
51: Image signal processing unit
52: Display control unit
53: Display unit
201: Color signal conversion unit
202: Level conversion unit
203: γ linear conversion unit
204: Display unit-compliant color gamut conversion unit
205: Linear γ conversion unit
501: CPU
502: ROM
503: RAM
504: Bus
505: I/O interface
506: Input unit
507: Output unit
508: Storage unit
509: Communication unit
510: Drive
511: Removable medium

The invention claimed is:

1. An image processing apparatus comprising:
a display control unit configured to
input an image signal for a high dynamic range (HDR) image or a standard dynamic range (SDR) image, and
generate an output signal into a display unit,
wherein the display unit is a SDR display unit with a γ value for SDR image,
wherein in a case where the image signal input into the display control unit is a HDR image signal, the display control unit performs a processing of converting the input HDR image signal, and generates and outputs a converted HDR signal according to a γ correction curve with an I/O characteristic reverse to a γ curve corresponding to an I/O characteristic of the SDR display unit to the display unit so that a correspondence between the image signal input into the display control unit and an output signal of the display unit is linear, and
wherein the display control unit is implemented via at least one processor.

2. The image processing apparatus according to claim 1, wherein the γ value for the SDR image is 2.2, and the γ curve corresponding to the I/O characteristic of the SDR display unit is a 2.2-th power curve,
wherein the γ correction curve is a (1/2.2)-th power curve with an I/O characteristic reverse to the γ curve, and
wherein in the case where the image signal input into the display control unit is the HDR image signal, the display control unit performs a processing of converting the input HDR image signal, and generates and outputs a converted HDR signal with an I/O characteristic according to the (1/2.2)-th power curve to the display unit.

3. The image processing apparatus according to claim 1, wherein in the case where the image signal input into the display control unit is the HDR image signal, the display control unit inputs the HDR image signal with an I/O characteristic according to a (PQ-1) curve reverse to an I/O characteristic of a SMPTE STTS 2084 curve (PQ curve), and performs a signal conversion processing.

4. The image processing apparatus according to claim 1, wherein the display control unit comprises:
a level conversion unit for performing a level conversion processing on the image signal input into the display control unit; and
a γ linear conversion unit for performing a signal conversion processing on the output of the level conversion unit,
wherein in the case where the image signal input into the display control unit is the HDR image signal, the level conversion unit performs a gain adjustment processing according to level conversion of the input HDR image signal,
wherein the γ linear conversion unit performs the signal conversion processing on the gain-adjusted HDR image signal, and generates the converted HDR signal, and
wherein the level conversion unit and the γ linear conversion unit are each implemented via at least one processor.

5. The image processing apparatus according to claim 4,
wherein the γ curve corresponding to the I/O characteristic of the SDR display unit is a 2.2-th power curve,
wherein the γ correction curve is a (1/2.2)-th power curve with an I/O characteristic reverse to the γ curve,
wherein the level conversion unit generates a HDR image signal with an I/O characteristic according to a (1/4.4)-th power curve in the gain adjustment processing, and
wherein the γ linear conversion unit performs a 2.2-th power processing on the gain-adjusted HDR image signal, and generates a converted HDR signal with an I/O characteristic according to the (1/2.2)-th power curve.

6. The image processing apparatus according to claim 4,
wherein the display control unit further comprises a display unit-compliant color gamut conversion unit for performing a display unit-compliant color gamut conversion processing on the output from the γ linear conversion unit, and
wherein the display unit-compliant color gamut conversion unit is implemented via at least one processor.

7. The image processing apparatus according to claim 6,
wherein the display control unit further comprises a linear γ conversion unit for performing a signal conversion processing on the output from the display unit-compliant color gamut conversion unit, and
wherein the linear γ conversion unit is implemented via at least one processor.

8. The image processing apparatus according to claim 7,
wherein the linear γ conversion unit does not perform the processing in the case where the image signal input into the display control unit is the HDR image signal, and performs the signal conversion processing only in a case where the image signal input into the display control unit is a SDR image signal.

9. The image processing apparatus according to claim 1,
wherein the display control unit further comprises a color signal conversion unit for performing a color signal conversion processing on the image signal input into the display control unit, and
wherein the color signal conversion unit is implemented via at least one processor.

10. An image processing method performed in an image processing apparatus,
wherein the image processing apparatus comprises a display control unit configured to
input an image signal for a high dynamic range (HDR) image or a standard dynamic range (SDR) image, and
generate an output signal into a display unit,
wherein the display unit is a SDR display unit with a γ value for SDR image, and
wherein in a case where the image signal input into the display control unit is a HDR image signal, the display control unit performs a processing of converting the input HDR image signal, and generates and outputs a converted HDR signal according to a γ correction curve with an I/O characteristic reverse to a γ curve corresponding to an I/O characteristic of the SDR display unit to the display unit so that a correspondence between the image signal input into the display control unit and an output signal of the display unit is linear.

11. A non-transitory computer-readable medium having embodied thereon a program, which when executed by an image processing apparatus of a computer causes the image process to perform an image processing,
wherein the image processing apparatus comprises a display control unit configured to
input an image signal for a high dynamic range (HDR) image or a standard dynamic range (SDR) image, and
generate an output signal into a display unit,
wherein the display unit is a SDR display unit with a γ value for SDR image, and
wherein in a case where the image signal input into the display control unit is a HDR image signal, the program causes the display control unit to perform a processing of converting the input HDR image signal, and to generate and output a converted HDR signal according to a γ correction curve with an I/O characteristic reverse to a γ curve corresponding to an I/O characteristic of the SDR display unit to the display unit so that a correspondence between the image signal input into the display control unit and an output signal of the display unit is linear.

* * * * *